United States Patent [19]

Morikawa et al.

[11] Patent Number: 5,142,613
[45] Date of Patent: Aug. 25, 1992

[54] FONT MANAGING APPARATUS FOR A CHARACTER GENERATOR

[75] Inventors: Takashi Morikawa; Yoshikazu Ikenoue, both of Osaka, Japan

[73] Assignee: Minolta Camera Kabushiki Kaisha, Osaka, Japan

[21] Appl. No.: 598,809

[22] Filed: Oct. 17, 1990

Related U.S. Application Data

[63] Continuation of Ser. No. 223,647, Jul. 25, 1988, abandoned.

[30] Foreign Application Priority Data

| Jul. 23, 1987 | [JP] | Japan | 62-186455 |
| Jul. 23, 1987 | [JP] | Japan | 62-186456 |
| Jul. 23, 1987 | [JP] | Japan | 62-186457 |
| Jul. 23, 1987 | [JP] | Japan | 62-186458 |
| Jul. 23, 1987 | [JP] | Japan | 62-186459 |
| Aug. 17, 1987 | [JP] | Japan | 62-203678 |

[51] Int. Cl.$^5$ ............................................. G06F 15/40
[52] U.S. Cl. ..................................... 395/110; 395/150
[58] Field of Search ............... 364/518, 519; 340/735, 340/790; 400/72, 172, 279; 395/110, 150

[56] References Cited

U.S. PATENT DOCUMENTS

| 3,964,591 | 6/1976 | Hill et al. | 400/72 X |
| 4,234,931 | 11/1980 | Kanaiwa et al. | 340/790 X |
| 4,594,674 | 6/1986 | Boulia et al. | 364/523 |
| 4,660,998 | 4/1987 | Tsuneki | 364/519 X |
| 4,660,999 | 4/1987 | Tsuneki | 364/519 X |
| 4,686,525 | 8/1987 | Nagata | 340/790 |
| 4,698,677 | 10/1987 | Kinghorn et al. | 340/790 X |
| 4,763,281 | 8/1988 | Arakawa | 340/735 X |
| 4,998,210 | 3/1991 | Kadono et al. | 364/518 |

FOREIGN PATENT DOCUMENTS

| 61-179749 | 8/1986 | Japan . |
| 61-179750 | 8/1986 | Japan . |
| 61-179751 | 8/1986 | Japan . |
| 61-179752 | 8/1986 | Japan . |
| 61-179753 | 8/1986 | Japan . |
| 61-179754 | 8/1986 | Japan . |
| 61-179755 | 8/1986 | Japan . |
| 61-179756 | 8/1986 | Japan . |

Primary Examiner—Gary V. Harkcom
Assistant Examiner—Mark K. Zimmerman
Attorney, Agent, or Firm—Burns, Doane, Swecker & Mathis

[57] ABSTRACT

In a printing system having insertable font cartridges, a font managing apparatus selects fonts when there is a change in the font to be printed. For example, when a font cartridge is detached or interchanged, the font managing apparatus detects the interchange or detachment of the font cartridge and reselects another font. The font managing apparatus can also change the attributes of the font to be printed.

3 Claims, 28 Drawing Sheets

Fig. 4
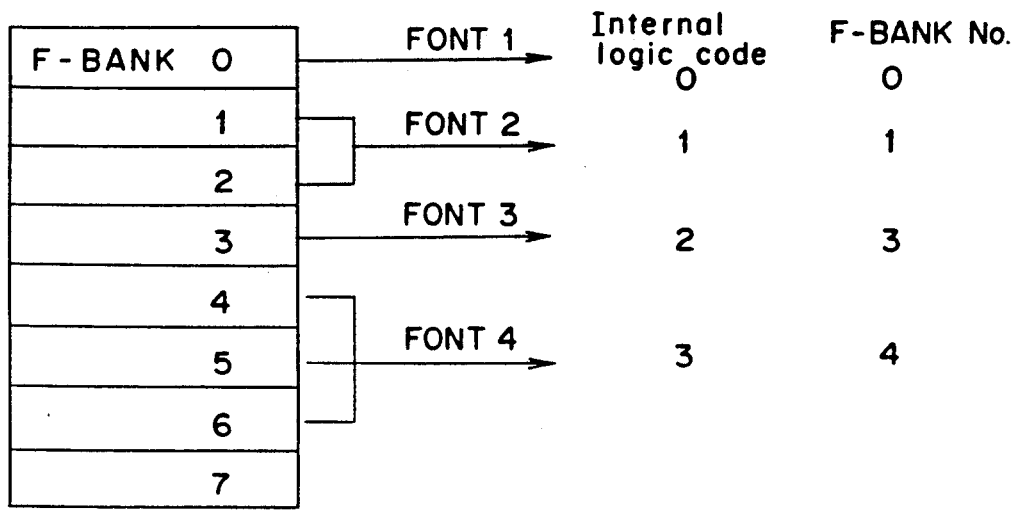
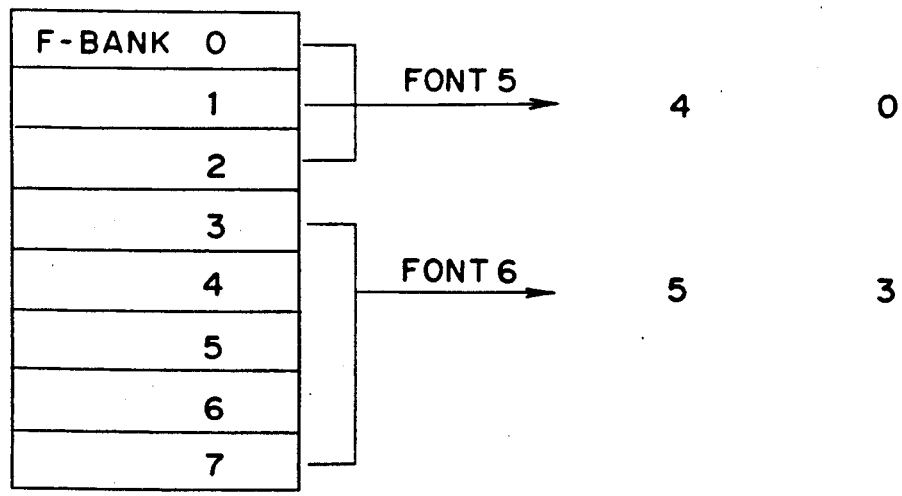
SLOT No. 3

Fig. 10(a)
Fig. 6(a)
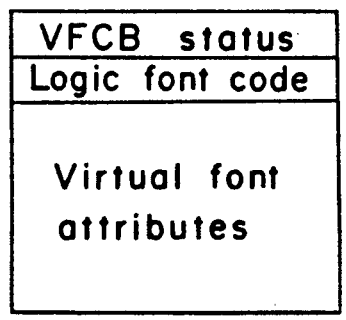
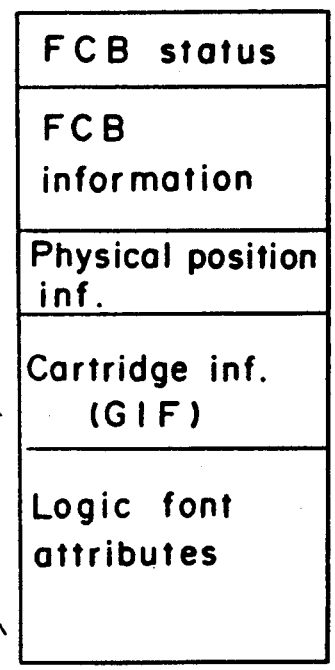
Fig. 10(b)
Fig. 6(b)
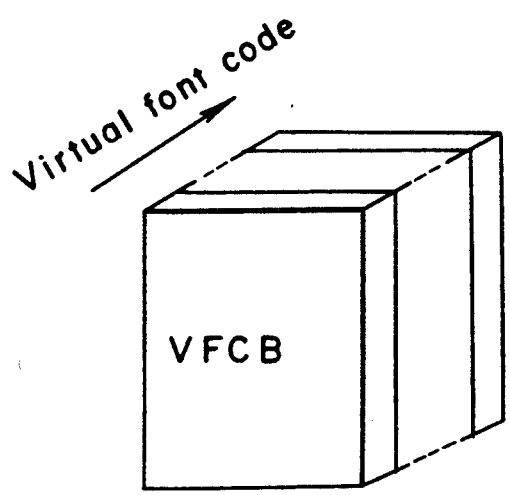
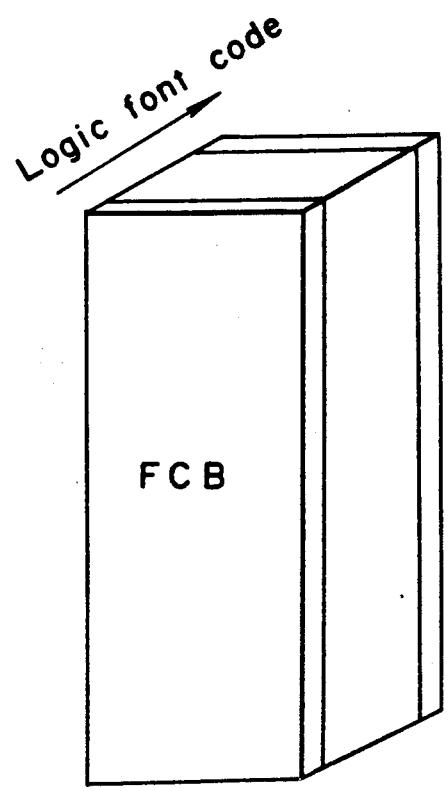

Fig. 7

| Addr | Field | Description |
|---|---|---|
| 0,1 | FCB status | including flags |
| 2 | Slot No. | slot number |
| 3,4 | Font address (L) | Area address in slot (work area) |
| 5,6 | Font address (H) | |
| 7 | Font direc. top No. | Top bank No. of direc. regist. |
| 8 | D-BANK number | Number of direc. regist. banks |
| 9 | F-BANK size | Number of banks |
| A,B | Start address of kanji font pattern (L) | Starting address of font pattern data in slot |
| C,D | Start address of kanji font pattern (H) | |
| E,F | Font size | Total number of bytes of font pattern data |
| 10,11 | Maximum chracter code | Maximum charater code having a directory |
| 12,13 | Total byte number of font(H) | Total volume of font |
| 14,15 | Total byte number of font (L) | |
| 16,17 | Bank off-set | Bank off-set value generating font access address |
| 18,19 | F-BANK No. | Bank number in slot |
| 1A–1F | — | — |
| 20 | Font style | Font use classification |
| 21 | Font type | Font type |
| 22–27 | Font name (ASCII 6 bytes) | Nickname |
| 28 | Font max. charac. code | Max. ASCII code (US ASCII: 7FH) |
| 29 | Font cell width | Max character width |
| 2A | Font cell height | Max. character height |
| 2B | Position of base line | Base line to top line |
| 2C | Font revision No. | Article No. |
| 2D | Font volume inf. No. 1 | Combined inf. & Bank size lank |
| 2E,2F | Font volume inf. No. 2 | Bank size coefficient |

Addresses 0–1F: data formed upon font selection
Addresses 20–2F: Font global data

|      | Font direc. top bank No. | Direc. bank size |
|------|--------------------------|------------------|
| F1 : | 0                        | 1                |
| F2 : | 1                        | 2                |
| F3 : | 3                        | 1                |
| F4 : | 4                        | 3                |

Select Font ⟶ F3

NEXT D-BANK pointer = 7

(number of valid empty D-BANK = 1)

(number of valid empty D-BANK = 4)

Select Font ⟶ F5

NEXT D-BANK pointer = 2

(number of valid empty D-BANK = 1)

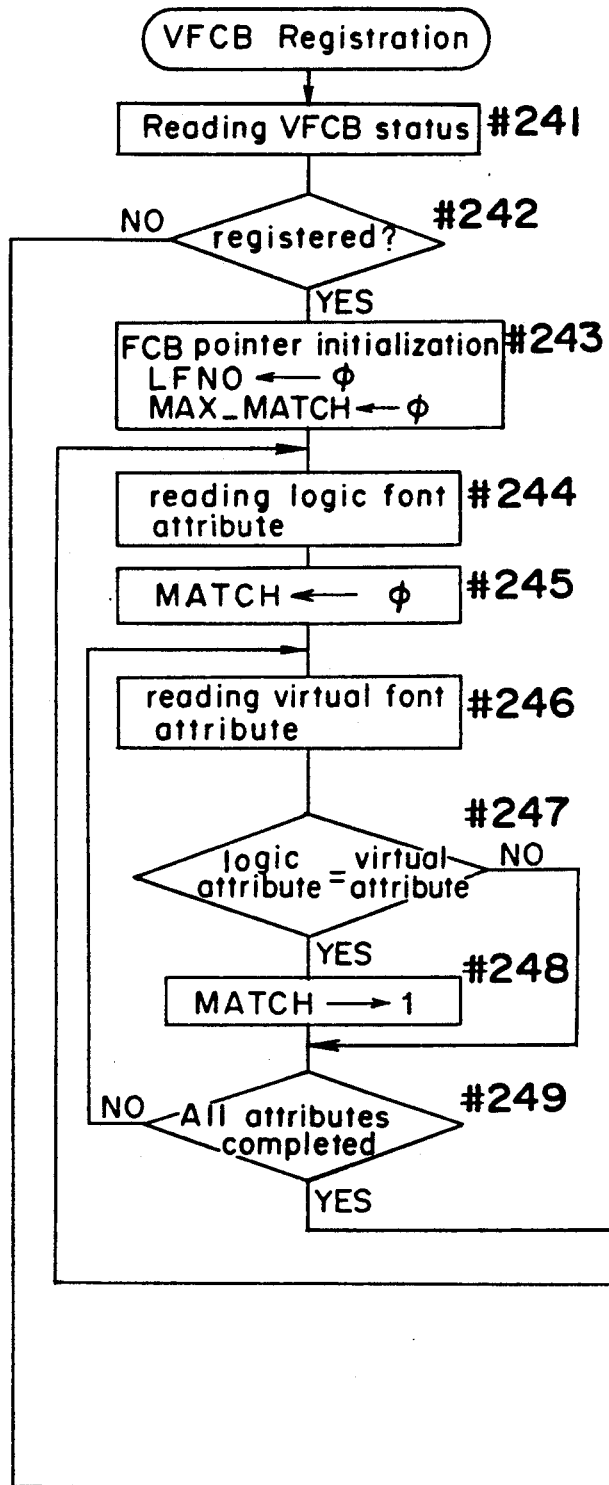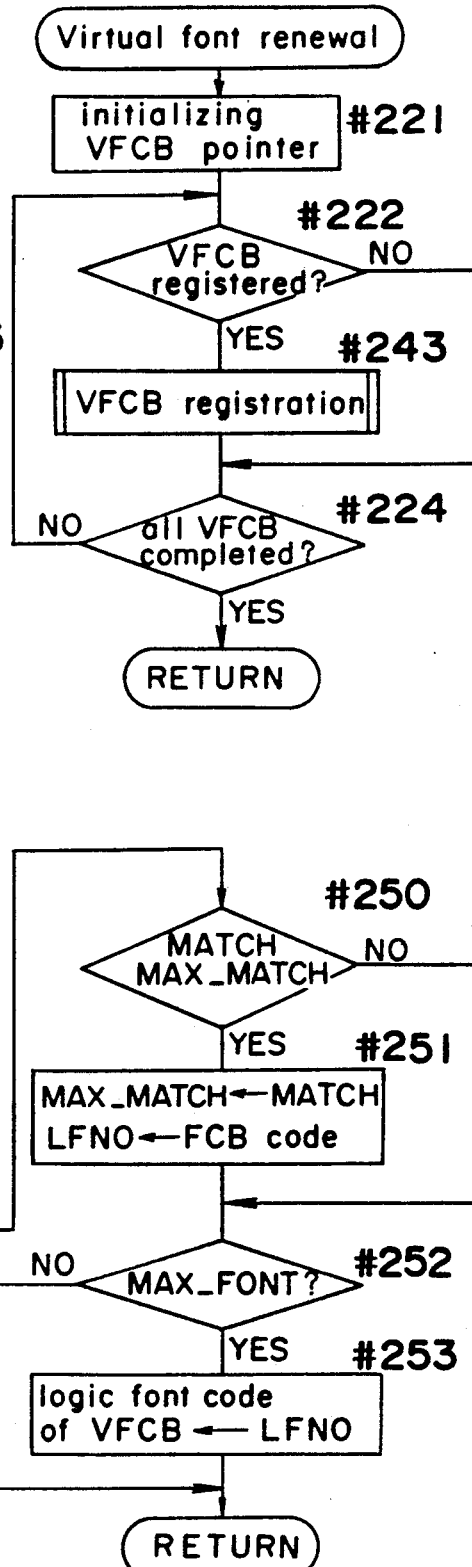
Fig. 23
Fig. 22

FONT MANAGING APPARATUS FOR A CHARACTER GENERATOR

This application is a continuation of application Ser. No. 223,647, filed July 25, 1988, now abandoned.

BACKGROUND OF THE INVENTION

1. Field of the Invention

The present invention relates to a font managing apparatus for a character generator in which plural font pattern data are stored.

2. Description of Prior Art

Conventionally, the character generator of bit map type has been well known. In the character generator of bit map type, each character is formed as a bit image on a bit map memory according to font pattern data stored in a font memory. In a character generator of bit map type, fonts of several kinds are selectably stored in the font memory. In order to increase the number of selectable fonts, interchangeable font cartridges each of which has a ROM or character generator together with a command for designating a font. The character generator transforms each of transmitted code data into a bit image consulting with pattern data of the designated font. Bit images thus formed are sent to a printer and, thereby, the document is printed out in accordance with the designated font.

In a character generator which provides a variety of interchangeable font cartridges, an area for registering management information of individual fonts is provided for managing available fonts in a system RAM. Upon starting the character generator or when one or more font cartridges are interchanged, respective management information of available fonts is registered or renewed into the font managing area of the system RAM.

As a memory for memorizing font data which is provided in a font cartridge, a rewritable RAM is used other than a ROM. As a rewritable RAM, a RAM backed up with a back up power source is desirably used to hold font data even when the character generator is turned off. The RAM of this type has an external by operable input switch and font data is considered to be loaded down thereinto from the host computer as far as the external input switch is switched on.

If the switch is switched off or in the case of a font RAM which does not provide a back up power source, font data can be loaded down thereinto from the host computer.

In a character generator wherein plural font cartridges are settable and interchangeable, there is a possibility such that the font cartridge presently selected is drawn out or moved to another slot even when editing operation of character images is executed.

In such a case, it becomes necessary to reselect a font to be used.

Conventionally, when the font cartridge in use is drawn out, a font cartridge set in the slot adjacent to that of the drawn out font cartridge is selected automatically. However, if the font is reselected in this way, the font is changed one to another on the way of printing and this worsens quality of print.

In another conventional character generator, the operation thereof is automatically stopped as an error when the font cartridge in use is drawn out. In this case, it becomes necessary to load down font data again in order to start the suspended printing operation. Upon loading down font data, if a command for selecting a font contained in neither of font cartridges having been set is entered, it is processed as an error which urges to cancel it.

In the character generator of this type, a font is designated by appointing a slot number or a font name. Accordingly, it becomes necessary for an operator to have a preliminary knowledge of the slot number or font name regarding the desired font. However, it is difficult to designate the desired font exactly since each font is defined by attributes of font such as font name, pitch (print width), point (height of character), weight (print thickness) and the like which are unfamiliar to an ordinary user. This invites miss operation often.

In a font memory contained in a font cartridge, directory of font data which includes address information with respect to font patterns corresponding to character codes is also stored. Upon accessing the font memory, address information of a font pattern corresponding to a character code sent from the host computer is read out from the directory at first and, thereafter, the font pattern designated by the address information is read out. Accordingly, it is always needed to access the directory of the font memory every character. This access operation is done parallel to imaging operation of characters and, therefore, access time becomes long. This fairly limits the processing time.

In JP-A 116551/1986, there is disclosed a font managing system wherein address information of directories of individual font memories is stored as a directory address table in a system RAM in order to manage directories. Upon accessing a font pattern, the directory address table is accessed at first and, then, the corresponding font pattern stored in the font memory is read out.

If the memory area to be assigned to the directory address table is reasonably narrow so as to shorten the addressing time, character imaging operation can be executed at a high speed.

However, in JP-A 116551/1986, directories of all available fonts are registered in the directory address table of the system RAM. Due to this, the system RAM must have a large volume.

SUMMARY OF THE INVENTION

One object of the present invention is to provide a font managing apparatus for a character generator having selectable fonts which is able to maintain quality of print as fine as possible even when it becomes necessary to reselect a font in printing or imaging characters.

Another object of the present invention is to provide a font managing apparatus for a character generator providing interchangeable font cartridges wherein an arbitrary font cartridge can be interchanged even if it is used for character imaging and can be set if it is not set yet without causing errors.

One more object of the present invention is to provide a font managing apparatus for a character generator having selectable fonts which is able to manage directories of various fonts efficiently without increasing a volume of a system RAM.

Further object of the present invention is to provide a font managing apparatus for a character generator having a variety of selectable fonts wherein a desirable font can be designated in the basis of a human sense thereto without indicating attributes thereof exactly.

BRIEF DESCRIPTION OF DRAWINGS

These and other objects and features of the present invention will become more apparent when the preferred embodiment of the present invention is described in detail with reference of accompanied drawings in that;

FIG. 4 is a diagram showing the composition of a font cartridge;

FIG. 6(a) shows a structure of each FCB (Font control bank) to be used for managing fonts;

FIG. 6(b) shows an alignment structure of FCBs;

FIG. 7 shows a composition of each FCB in detail;

FIG. 10(a) shows a composition of a VFCB (Virtual font control bank);

FIG. 10(b) shows an alignment structure of VFCBs;

FIG. 11 shows a composition of each VFCB in

FIG. 22 is a flow chart of a subroutine for font renewal;

FIG. 23 is a flow chart of a subroutine for VFCB registration;

DETAILED DESCRIPTION OF PREFERRED EMBODIMENT (a) Composition of the electro-photographic printer FIG. 1 shows a block diagram of an electro-photographic printer system to which the present invention is applied.

Figure 1:
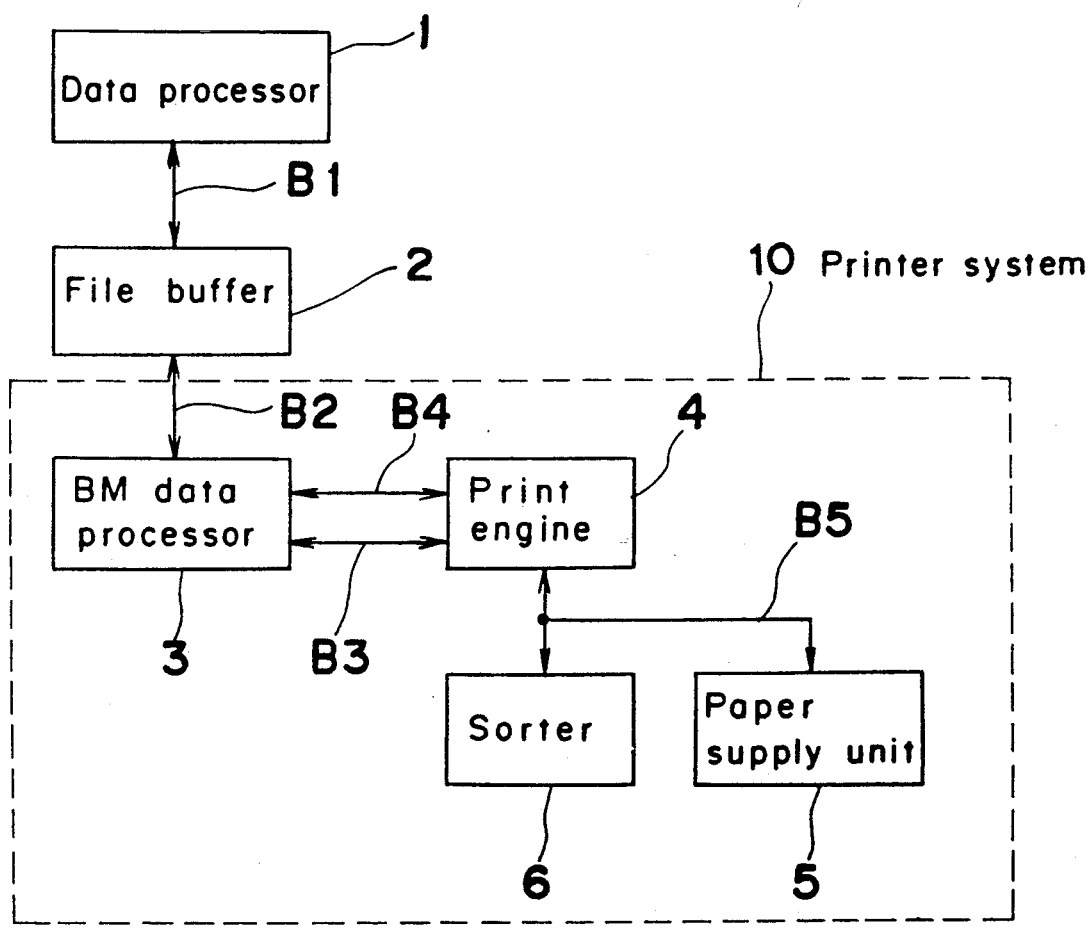
FIG. 1 is a block diagram of a printer system to which the present invention is applied.

Data sent from an external data processor 1 such as a host computer are stored in a file buffer 2 once in order to improve through-put of the external data processor 1 and stored data are outputted from the file buffer 2 to a printing system 10.

The printing system 10 is comprised of a data processor 3 of bit map type, a print engine 4 with use of an electro-photographic processor and a laser means and optional apparatuses such as an external paper supplying unit 5 and a sorter 6.

Figure 2:
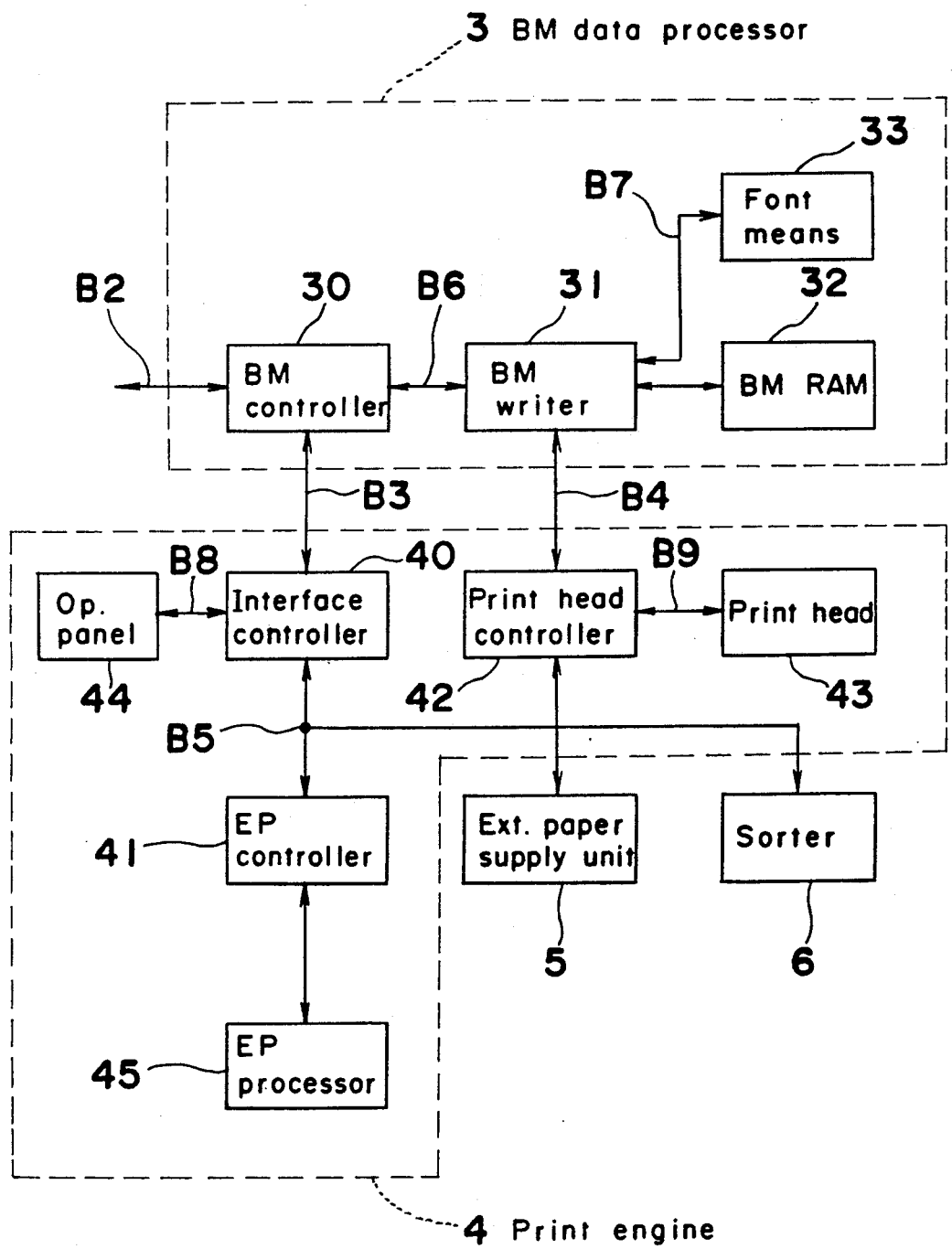
FIG. 2 is a block diagram showing a bit map data processor and a print engine of the printer system shown in FIG. 1.

FIG. 2 shows a schematic block diagram of the data processor 3 of bit map type.

The data processor 3 (hereinafter referred to BMU) is comprised of a bit map controller 30 (hereinafter referred to BMC), a RAM 32 for bit map (hereinafter referred to BM-RAM 32, a bit map writer 31 for imaging characters on BM-RAM 3 and font means 33. A font detecting sensor 339 is responsive to the font means 33 to detect the presence of a font cartridge. BMU 3 is connected to the print engine 4 by a bus B3 for control data and a bus B4 for image data.

The print engine 4 includes three controllers. The first one is an interface controller 40 (hereinafter referred to IFC) for executing processing of control data sent from BMC 30, control of an operation panel 44 and timing control for the print engine 4 through an internal bus B5. The second one is an electro-photographic controller 41 for controlling an electro-photographic processor 45 in accordance with data sent from IFC 40 through the internal bus B5. The third one is a print head controller 42 (hereinafter referred to PHC) controlling a semiconductor laser (not shown) and a polygon motor (not shown) of a print head 43 in accordance with information sent from IFC 40 through the internal bus B5 in order to write image data on a photoconductive drum provided in the electrophotographic processor 45 which is sent from BMW 31 through the internal bus B4. The external paper supply unit 5 and the sorter 6 are also controlled by IFC 40 through the internal bus B5.

The printer system 10 is so called laser printer of bit map type. Print data sent from the external data processor 1 are imaged as bit images on BM-RAM 32 of BMU 3 and bit images are outputted to the print engine 4. The print engine 4 drives the semiconductor laser to write those images as a latent image on the photoconductive drum and a toner image obtained by developing the latent image with toner is transferred onto a paper.

Data sent from the external data processor 1 includes codes for controlling the print format and setting modes of the print engine other than character codes.

BMU 3 analyzes protocols of these codes other than character codes and outputs commands for controlling the print format, passing a paper and altering modes of the optical apparatuses to the print engine 4.

The print engine 4 executes various control such as control of the electro-photographic system accompanied with the image control, timing control of a print paper and processing in synchronous with timing of feeding the print paper to the optional apparatus. The method for controlling the print engine 4 is substantially same to that of an electro-photographic copy machine except for control of the scanning system.

Figure 3:
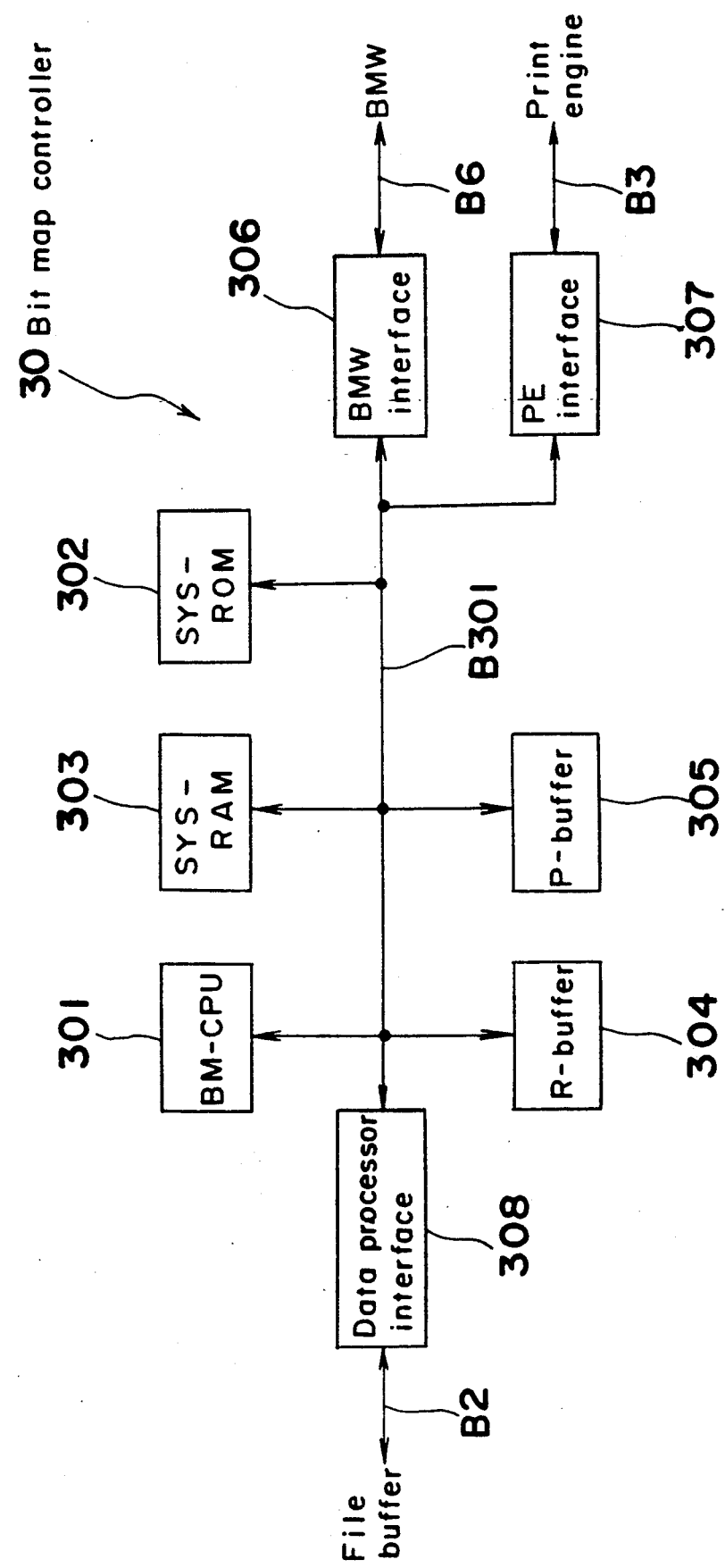
FIG. 3 is a block diagram showing a bit map controller provided in the bit map data processor shown in FIG. 2.

FIG. 3 shows a block diagram of BMC 30.

BMC 30 is comprised of some blocks interconnected by an internal bus B301. A CPU 301 (hereinafter referred to BM-CPU) forms a main part of BMC 30 which communicates with the external data processor 1 and/or the file buffer 2 through an interface 308 for the external data processor 1, transforms print data (code data) into bit images, controls BMW 31 through an interface 306 therefore and controls the print engine 4 through an interface 307 therefor. A system ROM (SYS-ROM) 302 memorizes programs for BM-CPU 301. A system RAM (SYS-RAM) 303 is an area for processing data and memorizing stacks and fundamental flags.

A register buffer (R-buffer) 304 is a buffer provided for communicating with the external apparatus such as the external data processor 1 and the file buffer 2 which enables to execute programs of BM-CPU 301 and communication with the external data processor 1 in asynchronous with each other.

A packet buffer (P-buffer) 305 memorizes data sent from the external data processor 1 as intermediate codes (hereinafter referred to packet codes) which are obtained by transforming data based on attributes of a selected font so as to make imaging bit images onto BM-RAM 32 easier.

The font means 33 provides memory area for interchangeable font cartridges (not shown) mounted. In each font cartridge, pattern data of fonts of eight kinds at the maximum can be stored, as will be explained later. The external data processor 1 selects a font among all fonts stored in respective font cartridges.

The font once selected can be changed to another one even in imaging characters and, also, it is not prohibited to interchange the font cartridge wherein the font used for imaging characters at the present is stored.

Although real imaging operation is done by BMW 31, it becomes necessary to calculate parameters such as internal addresses of pattern data in the selected font and writing addresses on BM-RAM 32. It takes a relatively long time. In order to speed up the processing, data of the next page is processed beforehand in printing bit images formed on BM-RAM 32 and processed data is stored in P-buffer 305. As P-buffer 305, it is desirable to use a first-in-first-out memory (FIFO).

A print engine interface 307 is an interface for the print engine 4 which communicates JOB information such as a number of prints and JOB control commands such as print command with an interface of the print engine 4 through the bus B3.

(b) Font management (1) Composition of the font cartridge

FIG. 4 shows a composition of a font cartridge inserted in a slot. Each font cartridge is comprised of eight banks from F-BANK 0 to F-BANK 7 which is comprised of a ROM or RAM. Font pattern data of each font is stored in one or more banks. Since, for example, font pattern data of a font of Chinese characters (Kanji) has a large volume, two or more banks are assigned to memorize font pattern data. However, it is prohibited to store font pattern data belonging to two or more fonts of different kinds in one bank. Also, it is prohibited to store font pattern data belonging to one font extending over two or more slots.

As shown in FIG. 4, in the No. 1 slot, four kinds of fonts FONT 1, FONT 2, FONT 3 and FONT 4 are memorized in banks F-BANK 0, F-BANKs 1 and 2, F-BANK 3 and F-BANKs 4 to 6, respectively. The last bank F-BANK 7 is empty. To respective fonts FONT 1 to FONT 4, internal logic codes 0 to 3 and F-BANK NUMBERS 0, 1, 3 and 4 indicating respective numbers of top F-BANKs from which fonts start, respectively.

In the No. 2 slot, FONT 5 is stored extending over three F-BANKs from 0 to 2 and FONT 6 is stored extending over F-BANKs from 3 to 7.

Other slots have an essentially same composition as No. 1 or No. 2 slot.

These slot No. and F-BANK No. are used for selecting a font, as will be explained later.

As font memories for the font cartridge, both of font ROM and rewritable font RAM are usable. The font RAM is used as memory for loading font pattern data from an external machine such as a host computer down thereto. There may be two cases with respect to the font RAM that font pattern data has been down loaded and that font pattern data has been unloaded. There are two types about the font RAM. One of them is of a type which is backed up with a back up power source and has an externally operable input switch. In this type, font pattern data once loaded down is maintained.

Another type does not have any back up means and therefore, font pattern data is cancelled when the power is switched off.

As will be explained later, the top byte of the font RAM is used as discrimination information. The font RAM, into which font pattern data is considered to be written according to information regarding the external input switch or font managing information (FCB), is registered as a loaded RAM.

Each font data is comprised of font global data, directory and individual dot patterns.

In the font global data, a font name of ASCII 6 is included. The font name is used for selection of a font, as will be explained later.

Figure 5A:
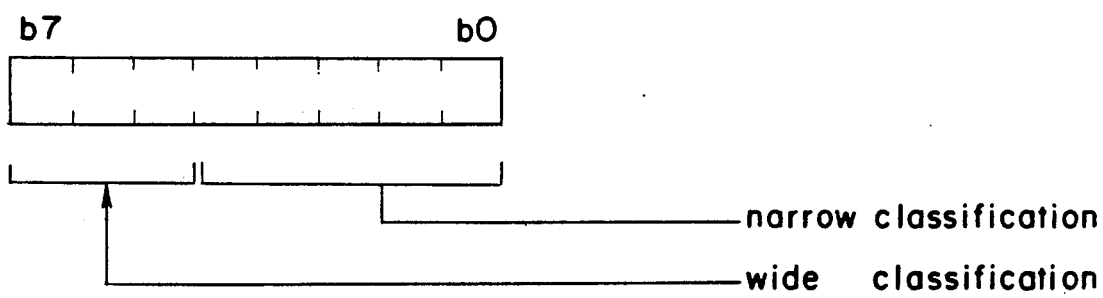
FIG. 5(a) and 5(b) show a structure of a code in a global data to be used for discriminating character type.

FIG. 5(a) shows a structure of a code which is included in the global data for discriminating character type. The code is comprised of eight bits from b0 to b7 and upper three bits ($b_7$, $b_6$, $b_5$) are used to indicate a wide classification and lower five bits ($b_4$, $b_3$, $b_2$, $b_1$ and $b_0$) are used to indicate a narrow classification. The wide classification is the most important discrimination information for management of fonts and, as an example, shown in the next table.

TABLE

| Wide Classification | Narrow Classification |
| --- | --- |
| 0 | Alphabetical typewriter |
| 1 | Alphabetical typewriter |
| 2 | — |
| 3 | — |
| 4 | JIS KANJI code |
| 5 | — |
| 6 | for form overlay |
| 7 | for down load |

*JIS (Japanese Industrial Standard)

Figure 5B:
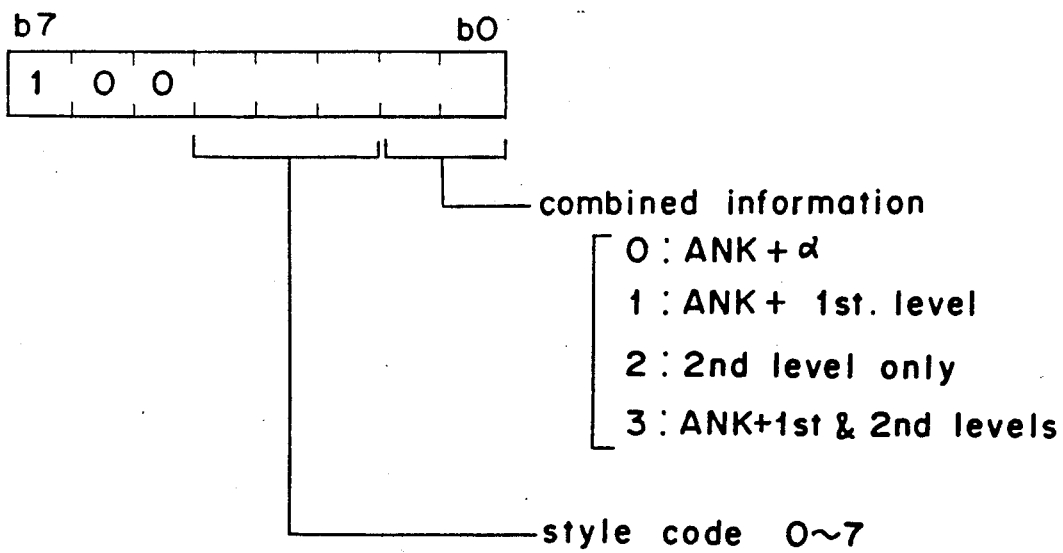

FIG. 5(b) shows a structure of the narrow classification of a font of JIS KANJI code system as an example.

The narrow classification code is comprised of a character style code of upper three bits ($b_4$, $b_3$ and $b_2$) and combination information code of lower two bits ($b_1$ and $b_0$) In FIG. 5(b), ANK indicates the alphabetical character and "Kana" character.

The structure of the narrow classification is defined in a proper manner to the wide classification to which the former belongs.

Font global data is read out when the power switch is switched on or when the font cartridge is interchanged and read out font global data is memorized as FCB (font control bank) in SYS-RAM 303 upon registration of font information.

(2) FONT MANAGEMENT INFORMATION (FCB)

BMC 30 executes fundamental management for fonts based on internal logic codes which are registration numbers given upon registration into FCB (Font Control Bank), as will be explained later.

FIG. 6(a) shows a composition of each FCB.

FCB is comprised of ECB status, FCB information, physical position information, cartridge information and logic font attribute. The logic font attribute is defined as attribute registered in the font management information of each available font. As shown schematically in FIG. 6(b), respective FCBs of all available fonts are memorized in SYS-RAM 303 in the order of internal logic font codes given upon registration of FCB.

FIG. 7 shows a composition of FCB in detail.

As mentioned in FIG. 6(a), FCB is comprised of FCB status, FCB information, physical position information, cartridge information and logic font attribute. All data of addresses from $\phi$ to 1FH are formed upon selection of a font. Slot number at 2nd address and bank number in slot at 18-th and 19-th addresses are used for selection of a font, respectively.

Data of addresses from 20 to 2F is font global data (cartridge information) read from respective cartridge.

FCB status is provided for indicating statuses of various flags.

Flags are defined as follows:
BUILD for indicating completion of FCB registration;
FONT for indicating font style;
ROM/RAM for indicating whether the memory of cartridge is ROM or RAM;
KANJI for indicating a chinese character font;
DOWN-LOAD for indicating a font cartridge for loading system programs and the like;
READY for indicating an enable state of font selection
LOADED for indicating whether font data is loaded into a font RAM or not;
FDIR for indicating registration of a font directory; and
SPECIAL for indicating a special font.
FCB information includes data as follows:
slot number, font address defined by linear address in a slot, top bank number of font directory registration, number of D-BANK indicating a number of banks into which respective font directories have been registered, starting address of "Kanji" font pattern indicating the top address of "Kanji" font pattern, font size indicating total number of bytes constituting font pattern data, maximum character code indicating the largest character code having a directory and total byte number indicating a total volume of respective font.

Physical position information includes bank off-set indicating an off-set value of a bank determined upon generating addresses for accessing respective font and F-BANK number for indicating a bank number in respective slot.

Cartridge information (font global information) includes data as follows:
font style indicating a kind of use of a font,
font type indicating a kind of character type of a font,
font name for selecting a font by the name thereof,
maximum character code in a font, font cell width indicating the maximum width of character,
font cell height indicating the maximum height of character,
position of base line,
font registration number indicating an article number,
font volume information No. 1 indicating combination information and bank size information, and
font volume information No. 2 indicating a bank size coefficient.

The area of logic font attribute is provided next to the cartridge information although it is not shown in FIG. 7. The logic font attribute includes use code, character type, character kind, character pitch, character height, character style and character weight.

(3) DIRECTORY REGISTRATION AREA (D-BANK)

Font directory is management information indicating individual characters memorized in the font ROM. However, if the font ROM is accessed every character, the through-put of data is lowered since processing parallel to imaging characters becomes impossible.

In order to avoid this problem, the directory of the selected font is loaded into SYS-RAM 303. Since this enables the parallel processing of imaging characters, processing time can be shortened.

Figure 8A:
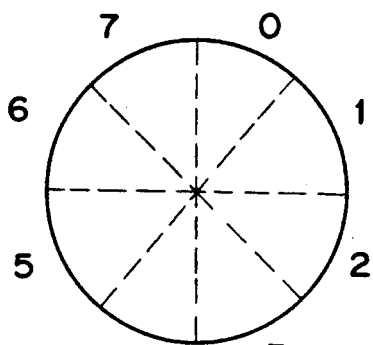
FIG. 8(a) shows a composition of a ring buffer for storing data of D-BANKs.

Directory registration area is provided next to the FCB area. As shown in FIG. 8(a), this is formed by 8 banks from D-BANK $\phi$ to D-BANK 7 of a ring buffer composition (one bank has a volume of 2 K bytes). Namely, D-BANK is defined as a section of the directory registration area.

Upon each registration of a font, plural D-BANKs can be used according to a directory size, if necessary.

Figure 8B:
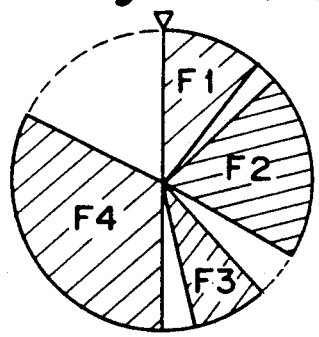
FIG. 8(b) shows a state wherein several D-BANKs are registered.

FIG. 8(b) shows a state of directory registration of four kinds of fonts (cross hatched areas show D-BANK used upon directory registration). With respect to each directory, top bank No. and directory size (bank No.) are defined and registered at 7-th and 8-th addresses, respectively. Further, directory registration flag FDIR indicating that at least one directory has been registered in a D-BANK and status valid flag indicating the validity of font management information included in each FCB are registered at zero-th address for FCB status. Also, D-BANK flag indicating existence of directory information is provided in each D-BANK.

Figure 9A:
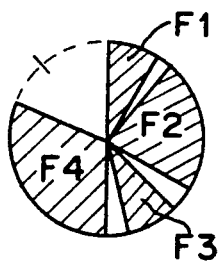
FIGS. 9(a), 9(b) and 9(c) show a manner for registering a new D-BANK.
Figure 9B:
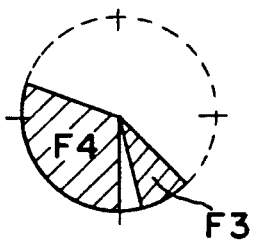
Figure 9C:
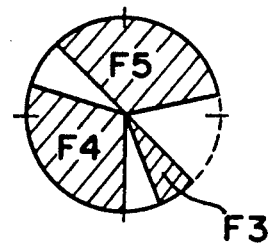

FIGS. 9(a), 9(b) and 9(c) show actions of a BANK pointer upon renewal of font directory.

If the font F5 having a directory of volume of three D-BANKs is selected in the state shown in FIG. 9(a) and the directory thereof is not registered, three D-BANK flags of D-BANKs from No. $\phi$ to No. 2 are reset at zero, respectively, as shown in FIG. 9(b). Then, the directory of the font F5 is loaded from D-BANK No. 7, as shown in FIG. 9(c).

(4) FONT REGISTRATION AREA (VFCB)

When an user designates a font by an identification number, the information of the designated font is memorized in a font registration area (hereinafter referred to VFCB) of SYS-RAM 303.

In such a case that a font is designated by an ID number, if the font cartridge containing the designated font is drawn out after registration of the ID number, another font having attributes close to those of the designated font is selected as far as it exists and, therefore, logic font code in VFCB is renewed. Thus, VFCB may have logic font code not corresponding to that of the designated font and the selected font is considered to be a virtual font in this case. In this context, the ID number is called VFCB code or virtual font code sometimes.

FIG. 10(a) shows a composition of each virtual font registration (VFCB) area.

VFCB area is provided in SYS-RAM 303. Considering possibility of expansion of the system, an area of 32 bytes is given to each VFCB.

As shown schematically in FIG. 10(b), all of VFCBs of available fonts are memorized, respectively.

VFCB is comprised of VFCB status determined upon entry of an ID number, logic font code and virtual font attributes. VFCB status includes a flag indicating that the VFCB has been registered and is valid. Logic font code is a registration number for managing fonts in internal processing and indicates FCB area in which respective font information is registered. Virtual font attributes are defined as those of VFCB set by an user in accordance with protocols from the external data processor 1.

Figure 11:
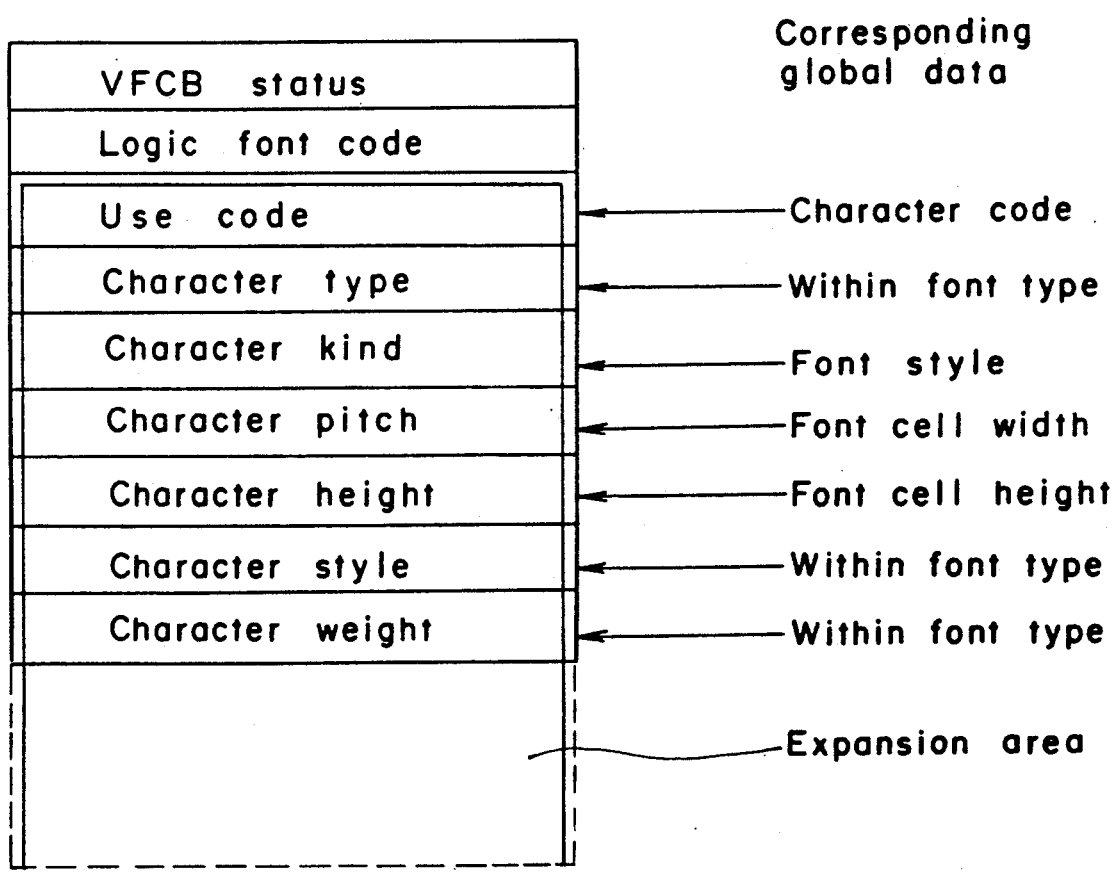

Data composition of virtual font attributes is shown in FIG. 11 in detail.

Virtual font attributes include a use code, character type, character kind, character pitch, character height, character style and character weight each of which corresponds to individual global data and have the same data composition as that of logic font attributes of FCB.

(c) Font selection

As will be later explained in detail, there are three stages for selecting a font in the image editing processing.

Namely, initial font selection upon switching on the power source, font selection by protocols from the external data processor 1 and font selection after interchange of a font cartridge are performed.

When the power source of the printer is turned on, any selection is not requested by the external data processor 1. However, the printer has default values for initialization including a default value for font selection, and according thereto, font selection processing is executed.

Figure 12:
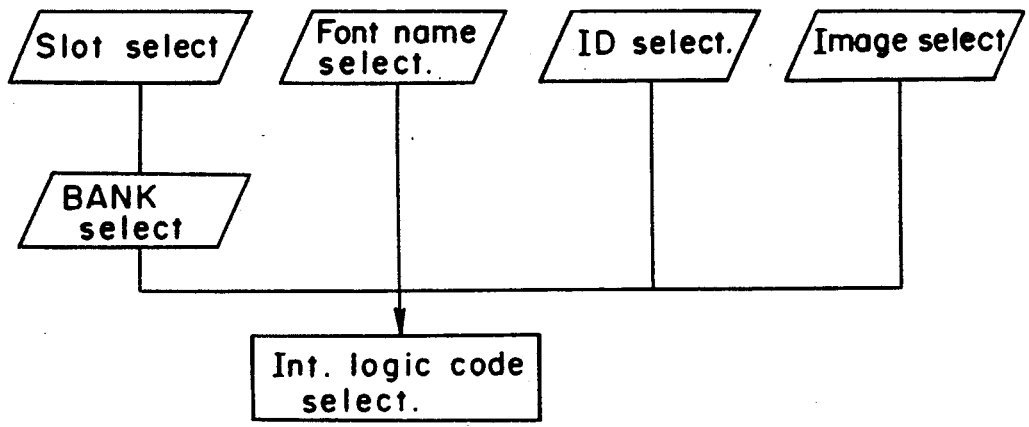
FIG. 12 is a diagram showing various methods for selecting a font.

The font selection by protocols from the external data processing 1 is performed according to either one of four ways, as shown in FIG. 12.

(1) Slot and Bank selection

As already explained in connection with FIG. 4, a slot number and an F-BANK number are assigned to each of mounted font cartridges upon reading font attributes and are registered in the corresponding FCB.

Accordingly, it is possible to select a desirable font directly by designating a slot number and an F-BANK number in the slot.

(2) Font name selection

As already explained in connection with FIG. 7, the font name is included in the global information of each FCB. Therefore, it is also possible to select a desirable font indirectly by designating a font name.

(3) ID selection

An user can assign an ID number to respective font freely.

Therefore, it becomes possible to select a desirable font by designating an ID number through the external data processor 1.

When a font is selected or designated, internal logic codes of the selected font including logic font code, slot number, BANK number, font name ID number and so on are selected. If the cartridge corresponding to the selected font is not mounted, another font having attributes closest to those of the selected font is searched and selected.

Selection information is comprised of these selected values and LAST SELECT MODE code. This LAST SELECT MODE code indicates the selection mode which was executed just before interchange of font cartridge among "slot and BANK" selection mode 1, "font name" selection mode 2 and "ID" selection mode 3. And, the code corresponding to the selection mode is set at an area assigned to LAST SELECT MODE. Upon renewal of selection information in the font selection, LAST SELECT MODE and corresponding selection value are renewed.

(4) Image selection

Although methods for font selection above mentioned are dependent on physical information such as physical position of the slot, the image selection is dependent on images regarding each font.

This image selection includes first and second methods as follows.

According to the first method, individual nicknames are given to identify respective attributes of each VFCB. Nicknames are prepared for Style, Width, Height and Thickness (Weight). As nicknames for Style, "Normal" and "Italic" are prepared to indicate levels of Style. As nicknames for Width, numerals representing character pitches are prepared to indicate individual levels of the character size. As nicknames for Height, numerals representing points of character are prepared to indicate individual levels of the character height. As nicknames for Thickness, "Light", "Medium", "Bold" and "Extra bold" are prepared to indicate levels of the character weight.

TABLE 2

| Nickname | Absolute level | | | | |
|---|---|---|---|---|---|
| | −2 | −1 | 0 | +1 | +2 |
| Style | Normal | Normal | Normal | Italic | Italic |
| Width (Pitch) | 20 | 15 | 12 | 10 | 6 |
| Height | 6 | 9 | 12 | 18 | 24 |
| Thickness (weight) | Light | Light | Medium | Bold | Extra Bold |

When these nicknames are entered, an absolute level is searched and determined in accordance with the combination of entered nicknames and attributes of the corresponding VFCB are renewed into values of attributes of a font identified by the determined absolute level As is clearly shown in Table 2, the character width and height become large and the character weight becomes thick as the absolute level increases.

Although all of default values in Table 2 are given beforehand, they can be set at user's side.

According to the second method, properties each of which is comprised of plural font attributes are represented by respective nicknames in order to identify an absolute level. These nicknames are chosen so as to fit to human senses. This enables to select or designate a font according to images or impressions thereabout.

Table 3 shows an example of nicknames.

TABLE 3

| Nickname | | Absolute level | | | | |
|---|---|---|---|---|---|---|
| | | −2 | −1 | 0 | +1 | +2 |
| Emphasis | Weight | Light | Light | Medium | Bold | Bold |
| | Pitch | 15 | 12 | 12 | 12 | 10 |
| Softness | Type | Normal | Italic | Normal | Italic | Normal |
| | Kind | Gothic | Gothic | Courier | Courier | Times-roman |
| Total size | Pitch | 20 | 15 | 12 | 10 | 6 |
| | Height | 6 | 9 | 12 | 18 | 24 |

The nickname "emphasis" is defined by the character weight and the character pitch so as to correspond to either one of absolute levels from (−2) to (+2). Similarly, the nickname "softness" is defined by the character type and the character kind and the nickname "total size" is defined by the character pitch and the character height.

When respective nicknames and relative levels of them are designated, an absolute level is searched and determined in accordance with these data and values of attributes corresponding to the determined absolute level are registered as a VFCB.

Figure 13A:
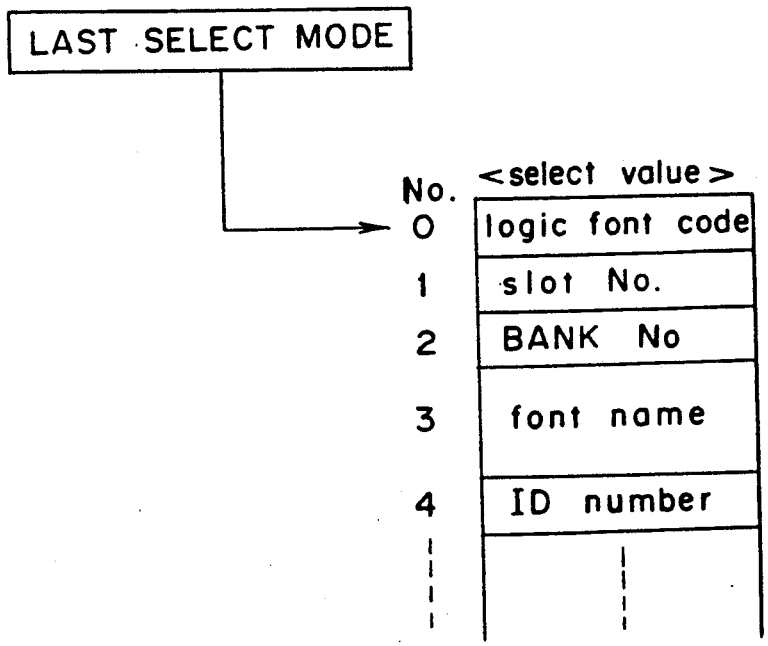
FIG. 13(a) is a composition of data to be used for selecting a font.
Figure 13B:
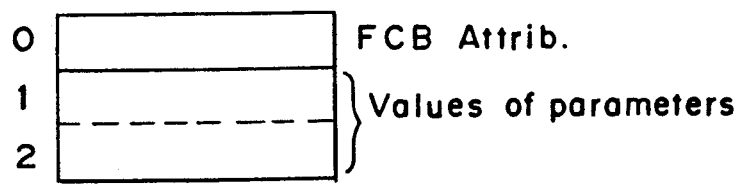
FIG. 13(b) is a composition of a font attribute defined by plural parameters.

The processing for altering the font can be done similarly to that of the first method. However, the number of attributes corresponding to one nickname is different from that of the first method. It is difficult to search an absolute level in the second method since attributes of VFCB are defined as parameters. In order to avoid this problem, it is desirable to provide tables for memorizing respective absolute levels corresponding to nicknames, as shown in FIG. 13(b).

Each nickname can be defined by three or more attributes.

Font reselection to be done after interchange of the font cartridge, after down-load of font data or upon selection by various emulaters can be done as follows.

At first, font attributes are read into again, then LAST SELECT MODE data is read out and a font is selected in accordance with select values corresponding thereto. If this font selection is impossible to do, a font defined by default values is selected similarly to the case of switching on of the power source.

Font RAM is treated as follows.

If it is not backed up with a back-up power source, font data which have not been registered in an FCB is registered thereinto upon renewal since it is considered to be unloaded or mounted newly.

If it is backed up with a back-up power source, it is decided according to information of the external input switch whether font data has been registered in the FCB or not.

(d) Image Edition and Initialization

Figure 14:
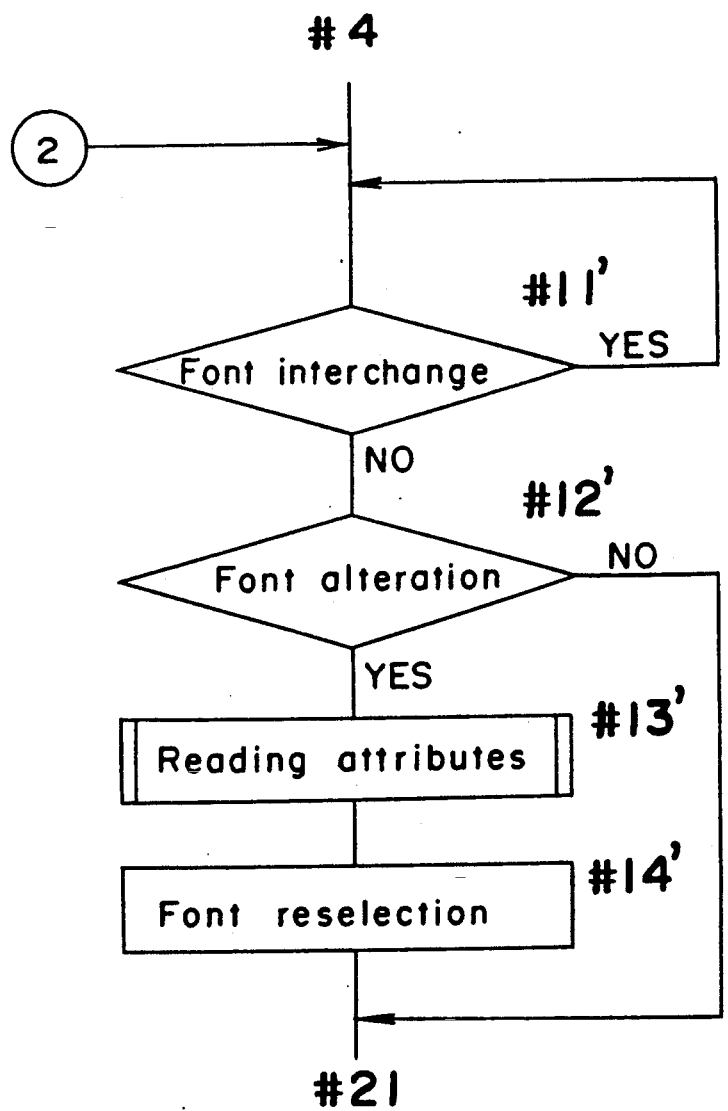
FIG. 14 is a partial flow chart showing a variation of the main routine.
Figure 14A:
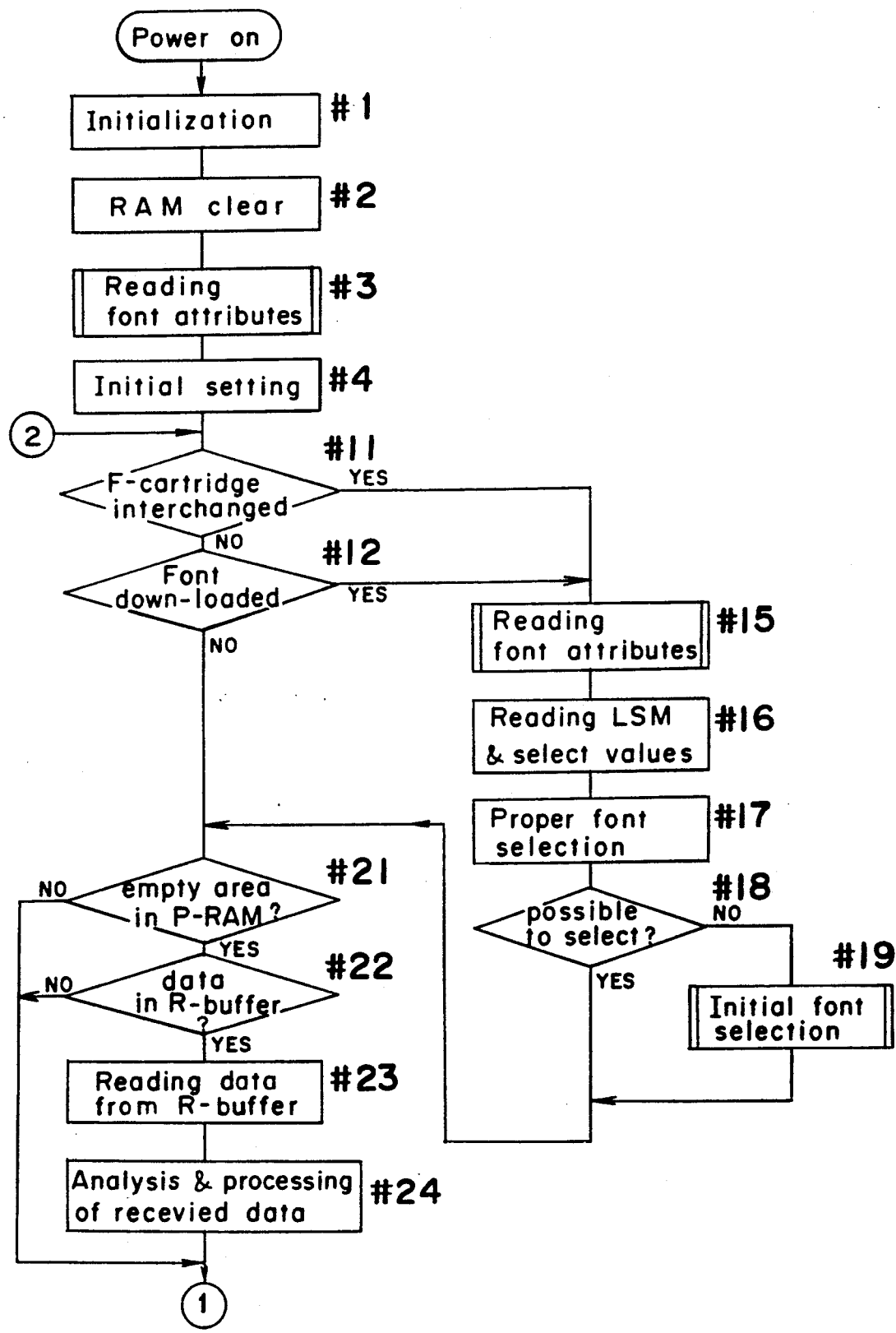
FIGS. 14(a) and 14(b) is a flow chart of the main routine to be executed by CPU of the bit map controller.
Figure 14B:
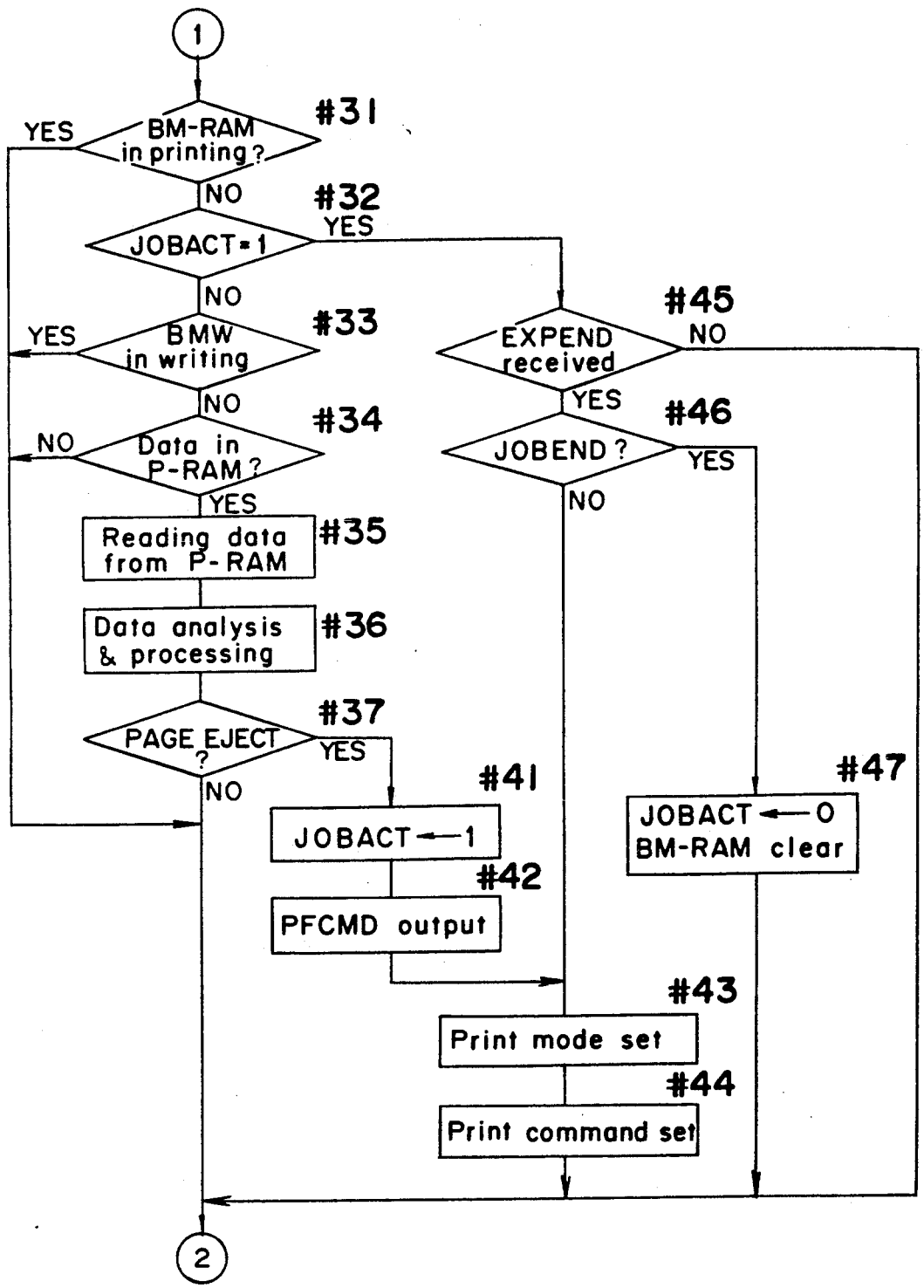

FIGS. 14(a) and 14(b) show the main routine to be executed by CPU 301 of BMC 30.

When the power switch is switched on, internal initialization is performed at step #1 and SYS-RAM 303 and BM-RAM 32 are cleared at step #2. Next, font attributes such as cell size are read into at step #3 and, then, initial settings such as initial setting by switches, initial setting of internal default values including default values for selecting a font and initial font selection are executed at step #4.

As initial settings by switches, resolution upon imaging, protocol transformation tables corresponding to various protocols and interface switching (CENTRONICS, RS 232C) are set. As initial settings by internal default values, initial font selection and initial margin setting are performed. Thereafter, the process enters into a processing loop for data received from the external data processor 1.

When at least one font cartridge is interchanged or when font data is down-loaded (at step #11 or #12), attributes of respective font are read similarly to the case of switching on the power switch since available fonts are changed (at step #15). At step #16, LAST SELECT MODE is read out and the font selection is done in accordance with select values corresponding to the LAST SELECT MODE at step #17. If it is decided impossible, a font in the BANK of the minimum number of the slot having the minimum number is selected as the default font at step #19.

These steps from #11 to #19 can be replaced with steps from #11' to #14' in FIG. 14'. Namely, a flag is read at step #11' which is set according to information given by means for detecting interchange of the font cartridge. If a font cartridge is now being interchanged, the process waits until the interchange of font cartridge is finished. However, data receiving operation is continued during the waiting time. If a font cartridge is not in interchanging, it is decided at step #12' whether or not font altering operation has been finished If the font having been selected is to be altered, attributes of each font is read into at step #13' and, then, a font is reselected at step #14'. Namely, renewal of internal information is executed according to the font alteration and the default font which is selected upon switching on the power source is reselected.

As stated above, the font reselection is requested upon the interchange of font cartridge or upon download of font from the external data processor 1. As to alteration methods of font and internal information, they will be explained later. According to this processing, analysis of received data is not performed in altering a font. This enables to avoid data errors which may be caused by noises caused by the interchange of cartridge and, therefore, misprocessing to the received data can be avoided.

Further, it becomes possible to register a font which was not registered upon receiving data since, due to the processing for reading font attributes and that for reselecting a font, all of available fonts are registered newly after the font alteration.

Next, it is checked at step #21 whether or not P-RAM 305 has at least one empty area and, at step #22, it is checked whether or not data is stored in R-buffer 304. If P-RAM 305 has at least one empty area and R-buffer 304 has data therein, data is read out from R-buffer 304 at step #23 and protocols related to the print format and font selection are analyzed and processings needed from the result of protocol analysis are performed at step #24.

Font selection is performed according to procedures shown in FIGS. 24(a), 24(b), 25 and 27 as the result of protocol analysis.

If P-RAM 305 does not have any empty area or no data is received in R-buffer 304, no processing is done.

Next, if BM-RAM 32 is possible to access since the printer is not printing (at step #31), if JOBACT flag is not set, namely the printer is not in multi-printing (at step #32) and if the latest character is not being written into BM-RAM 32 (at step #33), data in P-RAM 305, if it exists therein (at step #34), is read out at step #35 and read data is analyzed and processed at step #36.

If the data is decided to be PAGE EJECT code as the result of analysis at step #37, JOBACT flag is set at step #41 to enter printing operation.

If it is not PAGE EJECT code, the process returns to step #11 in order to process the next data.

The above processing is not performed if BM-RAM 32 is in writing or there is no data in P-RAM 305 even when the printer is not in printing.

When JOBACT flag is set at step #41, PFCMD for requesting paper feed is outputted at step #42, the interface of PHC 42 is set in the enable state for printing at step #43 and PRCMD (print command) is outputted to the interface controller 40 at step #44, and, due to this, the printing operation is started.

The interface controller 40 outputs EXPAND whenever an exposure of image is completed and control of the number of prints is performed by receiving EXPAND at step #45.

When JOBEND indicating completion of printing is detected at step #46, JOBACT flag is reset to release the printing state and BM-RAM 32 is cleared at step #47.

Figure 15:
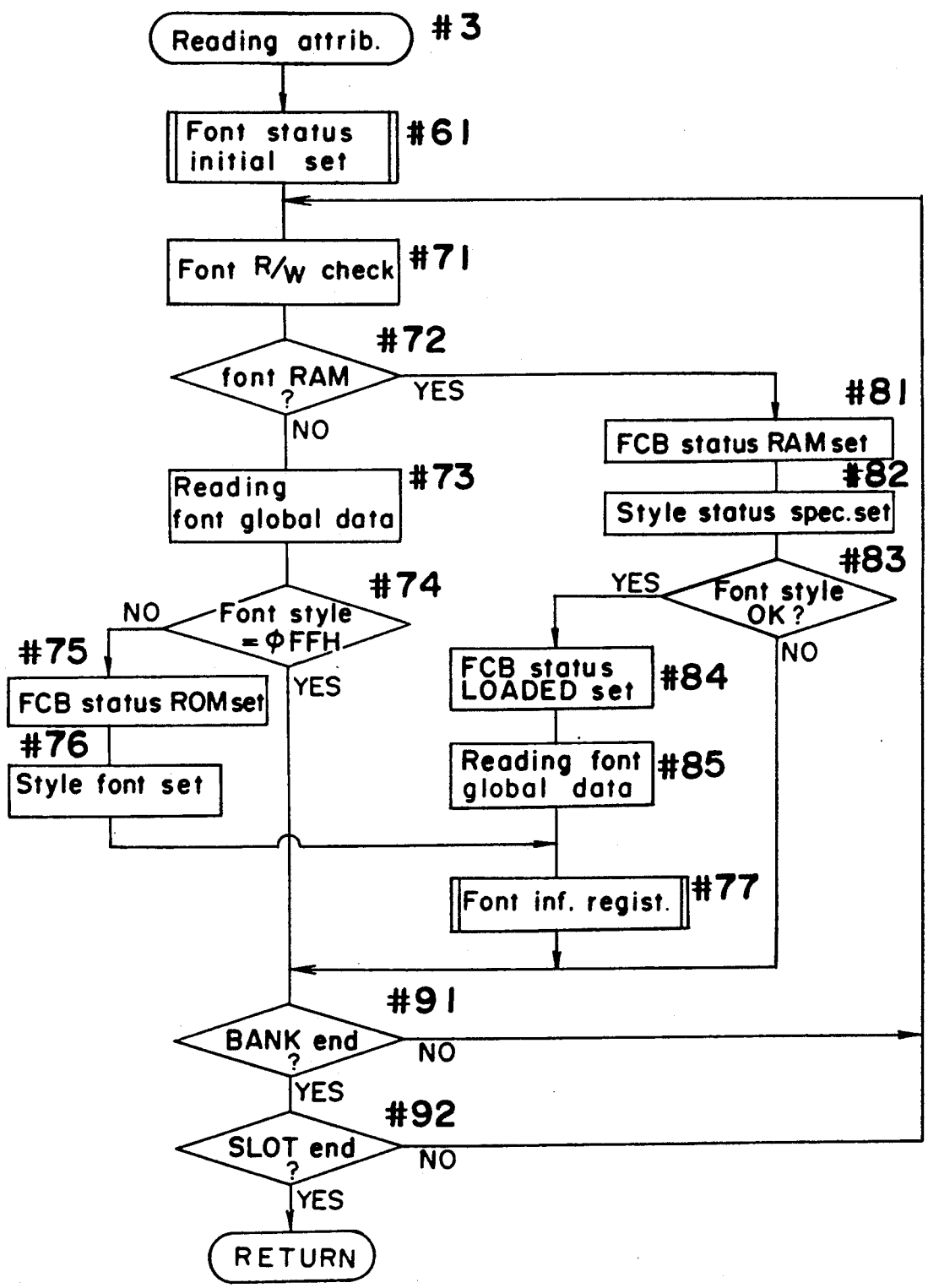
FIG. 15 is a flow chart of a subroutine for reading font attributes.

FIG. 15 shows a flow chart of the processing for reading font attributes from each of mounted font cartridges.

This processing is performed to generate font management information for font selection upon switching on the power switch or font interchange of a font cartridge.

At first, pre-processing for a RAM cartridge is executed at step #61.

Next, respective font cartridges are checked. At first, Read/Write check is performed with respect to the top one byte of the top F-BANK $\phi$ of the top slot at step #71.

If it is not a font RAM (at step #72), font global data is read into at once at step #73. If the value of font style is equal to $\phi$FFH (YES at step #74), it is decided that there is no font cartridge. If it is not so (No at step #74), ROM flag of FCB status is set at step #75, style status FONT flag indicating a font style is set at step #76 and, then, data is registered into the corresponding FCB at step #77.

If it is decided to be a font RAM at step #72, RAM flag of FCB status is set at step #81 and style status in FCB status is set at a special specification at step #82.

Next, the font style at the top of each F-BANK is rechecked at step #83. If it is not cleared in the processing for initial setting of status (See FIG. 16), LOADED flag of FCB status is set at step #84 as is considered to be a valid font and font global data is read into at step #85 and registered in the corresponding FCB at step #77.

Analysis of font attributes is thus performed about all F-BANKs and all slots (at steps #91 and #92).

Figure 16A:
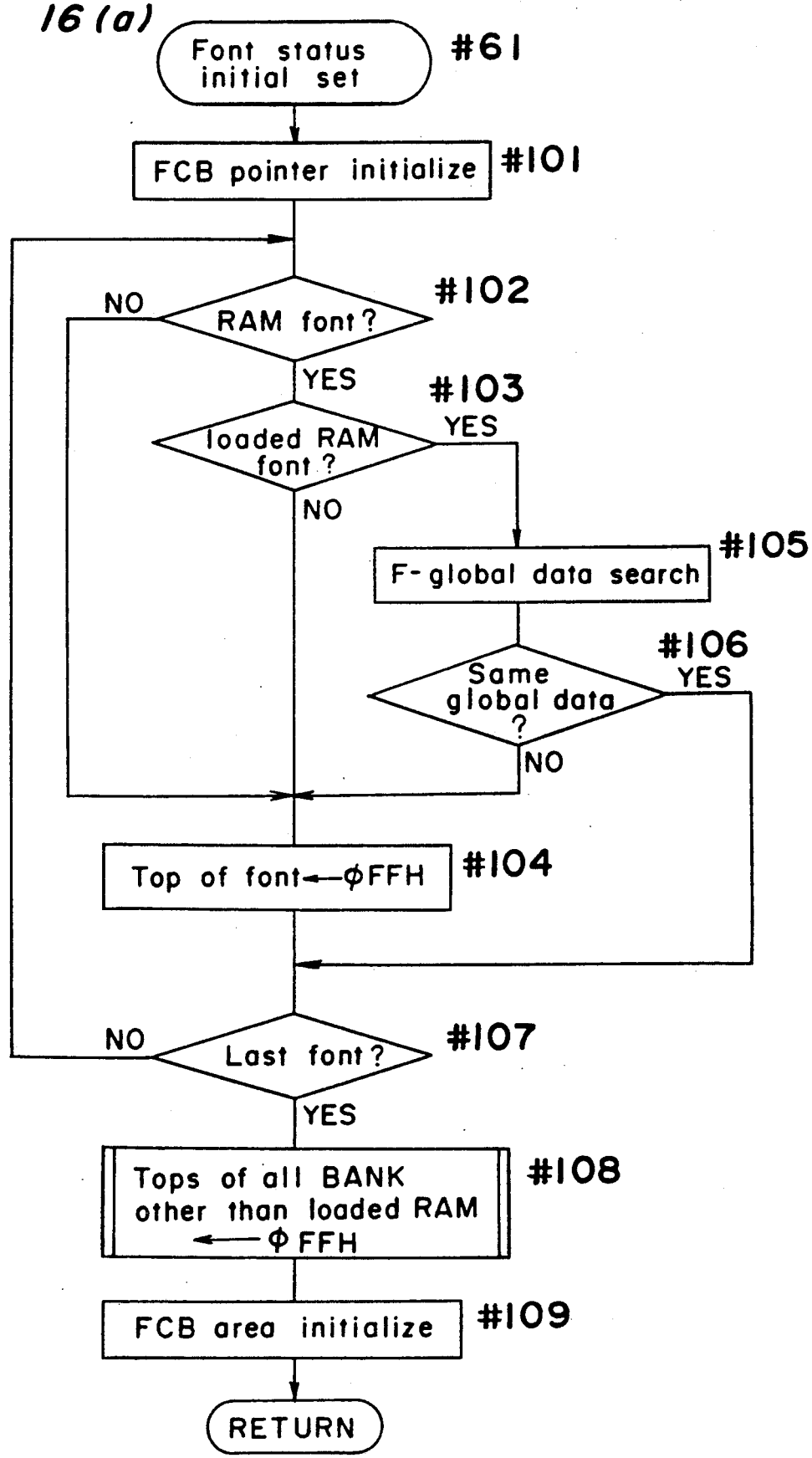
FIG. 16(a) is a flow chart of a subroutine for font status initial setting.

FIG. 16(a) shows a flow chart of a subroutine for initial setting of font status.

It becomes necessary to renew the font management information if a font cartridge having the font memory wherein the font having been selected at the present is stored. This subroutine is provided therefor.

At first, FCB pointer indicating the top address of FCB is initialized at step #101. If it is decided that the font memory is not a font RAM (No at step #102) or if it is decided that the font memory is a font RAM but it is not registered as loaded (NO at step #103), the top one byte of F-BANK is cleared, namely, "$\phi$FFH" is written thereinto at step #104.

If the font RAM is registered as loaded, the global data thereof is compared with all of global data of all slots and all F-BANKs to find a font cartridge having the same global data. If the font cartridge is not found at step #106, the top one byte of F-BANK is cleared at step #104 since this means that the font cartridge has been drawn out. Positions of slot and BANK are determined from the FCB. If the font memory is a font RAM, the process skips steps #103, #105 and #106 since it is not cleared.

If the same RAM cartridge is found out at step #106, no processing is done.

This processing is repeated until all of FCBs are registered (at step #107).

Next, each top one byte of all BANKs not registered as loaded RAMs is cleared at step #108 and, then, the FCB area is cleared at step #109.

Accordingly, "$\phi$FFH" is memorized at respective top one byte of all F-BANKs including empty slots other than loaded RAMs and ROM fonts and, therefore, the discrimination information needed upon the processing for reading font attributes shown in FIG. 15.

Figure 16B:
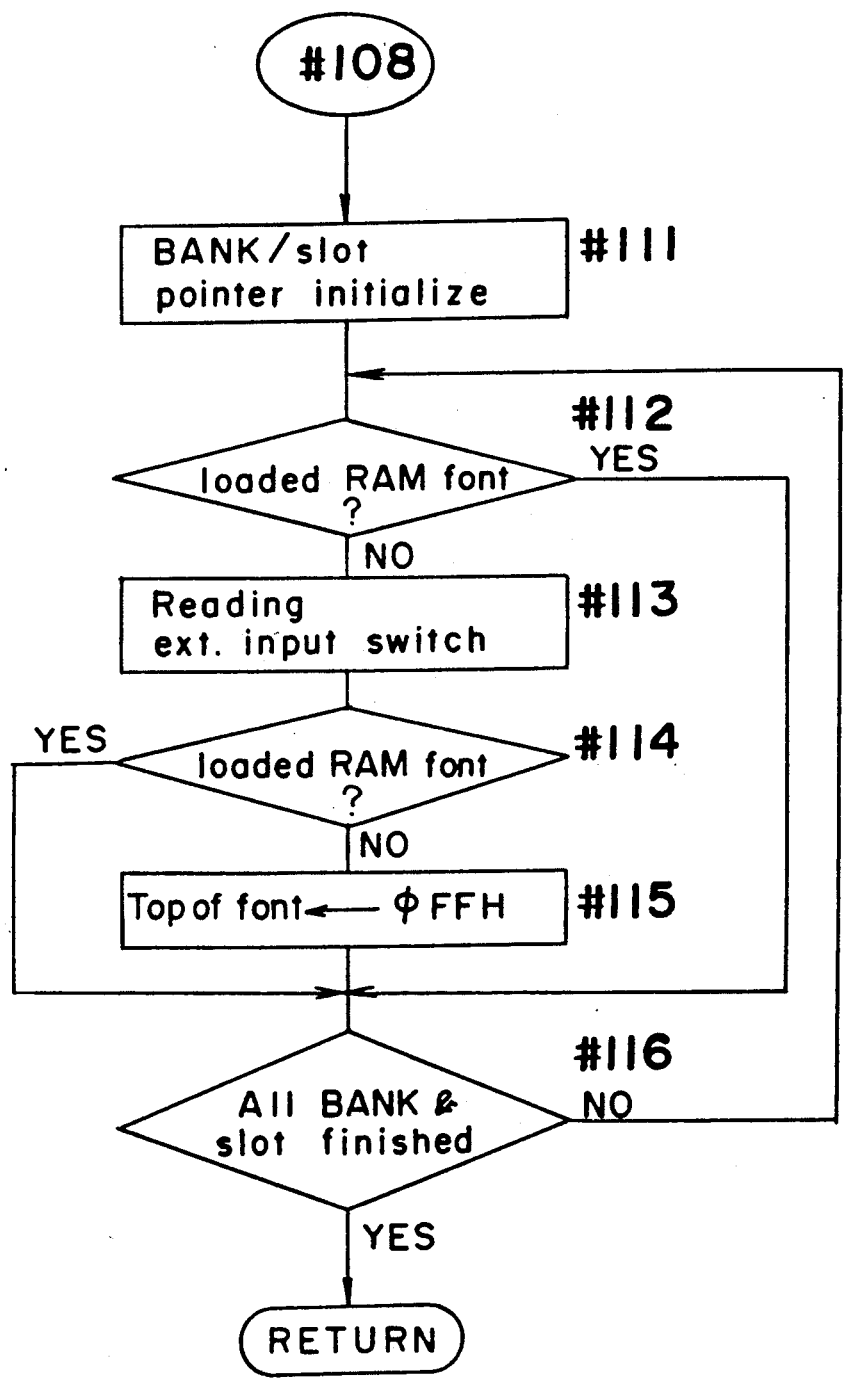
FIG. 16(b) is a partial flow chart showing a variation of the subroutine shown in FIG. 16(b)

FIG. 16(b) shows the subroutine #108 of FIG. 16(a) in detail.

At first, pointers for indicating the top addresses of the slot and BANK are initialized at step #111. Next, it is checked at step #112 if the RAM font is registered as loaded RAM in the corresponding FCB. If it is not registered, the state of the external input switch of each font cartridge is read at step #113. If it is decided at step #114 that the font is not a loaded RAM font, the top one byte of the font is cleared at step #115. The processing is performed about all slots and all BANKs.

Figure 17:
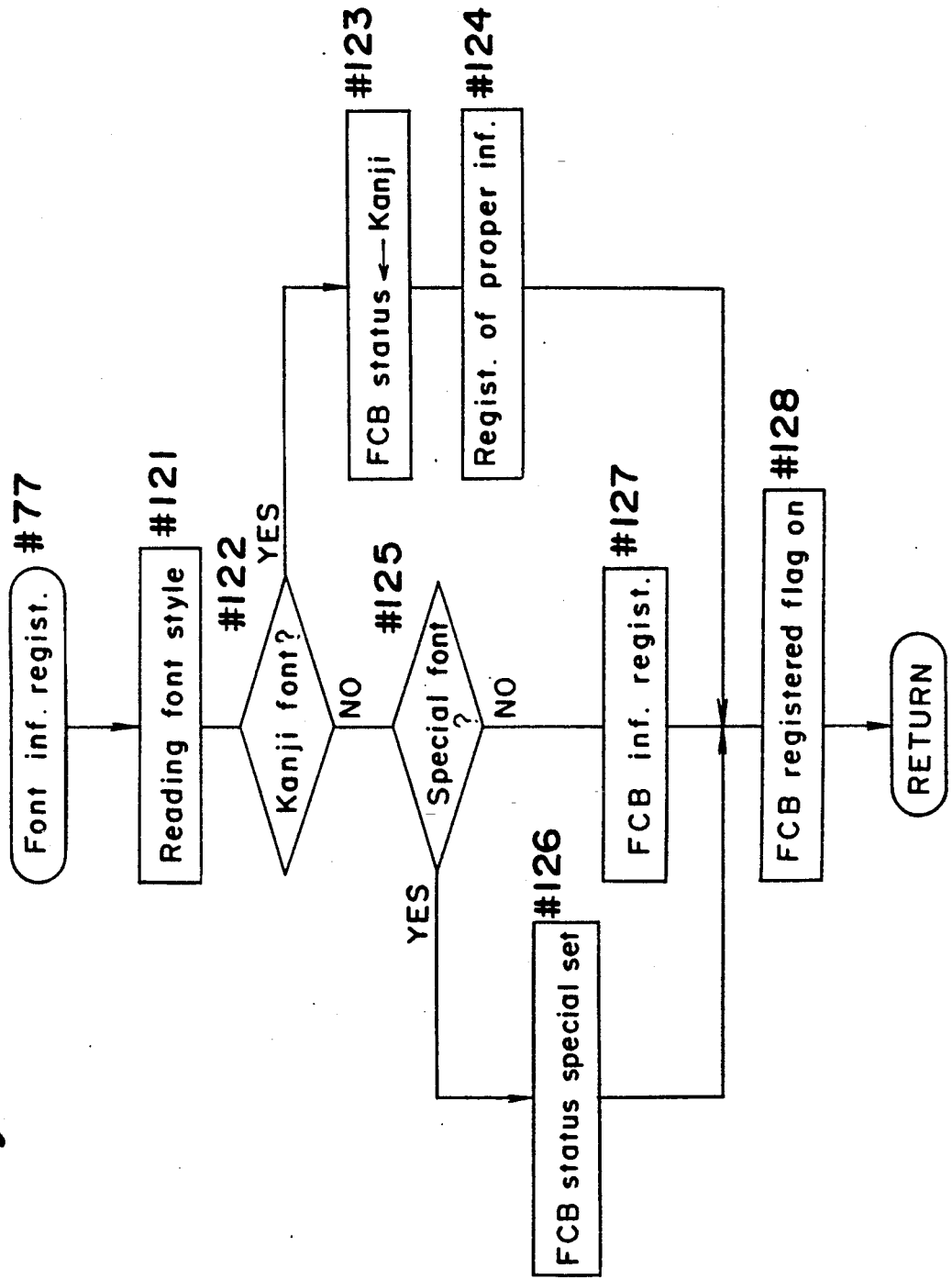
FIG. 17 is a flow chart of a subroutine for font information registration.

FIG. 17 shows a flow chart of the subroutine #77 for registering font information shown in FIG. 15.

As shown in Table 1, font cartridges for alphabetical fonts of two kinds, a font cartridge for JIS KANJI font and a font cartridge for form overlay font are prepared in the present preferred embodiment.

When global information of a valid font is read, font information thereabout is registered according to this processing.

At first, font style data in the global information is read at step #121. If it is discriminated to be the Kanji font at step #122 or the special font at step #125, a proper FCB status is set at step #123 or #126.

With respect to the Kanji font, management information proper thereto, namely information of the top address thereof is registered together with the normal management information of a font at step #124.

In the case of an alphabetical font, only individual information of FCB is registered at step #127. Finally, FCB REGISTERED flag which indicates that the information of the corresponding FCB has been registered is set at FCB status at step #128.

Thus, all of FCBs regarding fonts available at the moment of switching on the power source are registered in system RAM 303.

Figure 18:
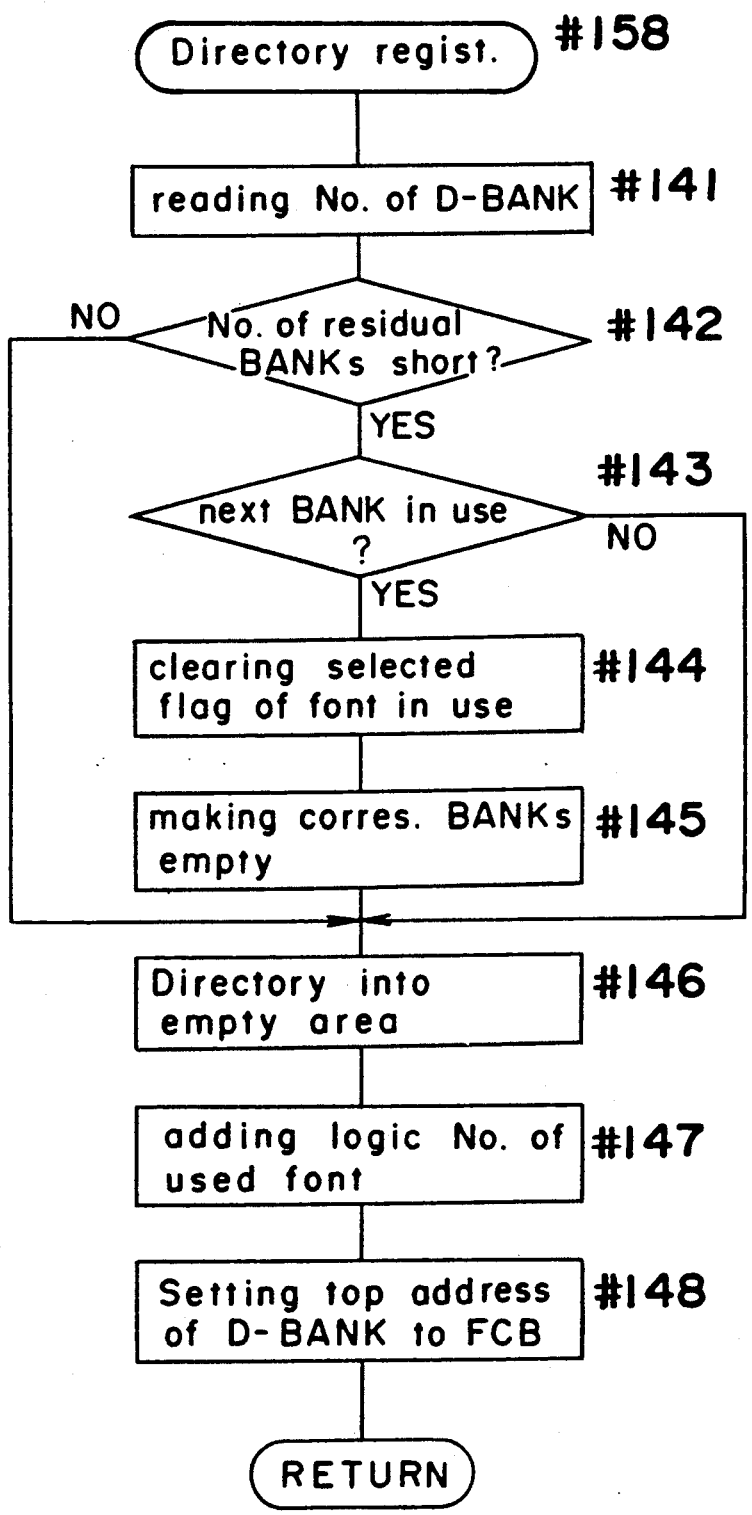
FIG. 18 is a flow chart of a subroutine for font directory registration.

FIG. 18 shows a flow chart of a subroutine for registering individual font directories.

When the directory of the default font is selected upon switching on the power switch, a number of D-BANKs is read at step #141.

If the number of residual BANKs is not short at step #142, the process is advanced to step #146, the directory of the selected font is registered into empty BANKs of a work area of a D-BANK in the order from D-BANK No. $\phi$ to D-BANK No. 7 whenever a registered font is selected. Then, a logic number is assigned to the used font at step #147 and, at the same time, the top BANK number of the used D-BANK is memorized in FCB at step #148.

If the number of empty BANKs is short (at step #142), the processing for making an empty space enough for registering the directory is performed as shown in FIGS. 9(a) to 9(c) schematically. As stated already, D-BANK has a structure of ring buffer and, therefore, BANKs are used to register the directory except for BANKs in use (at step #143). At that time, SELECTED flag of FCB status is cleared at step #144 and the directory of the old font is made invalid at step #145.

Figure 19:
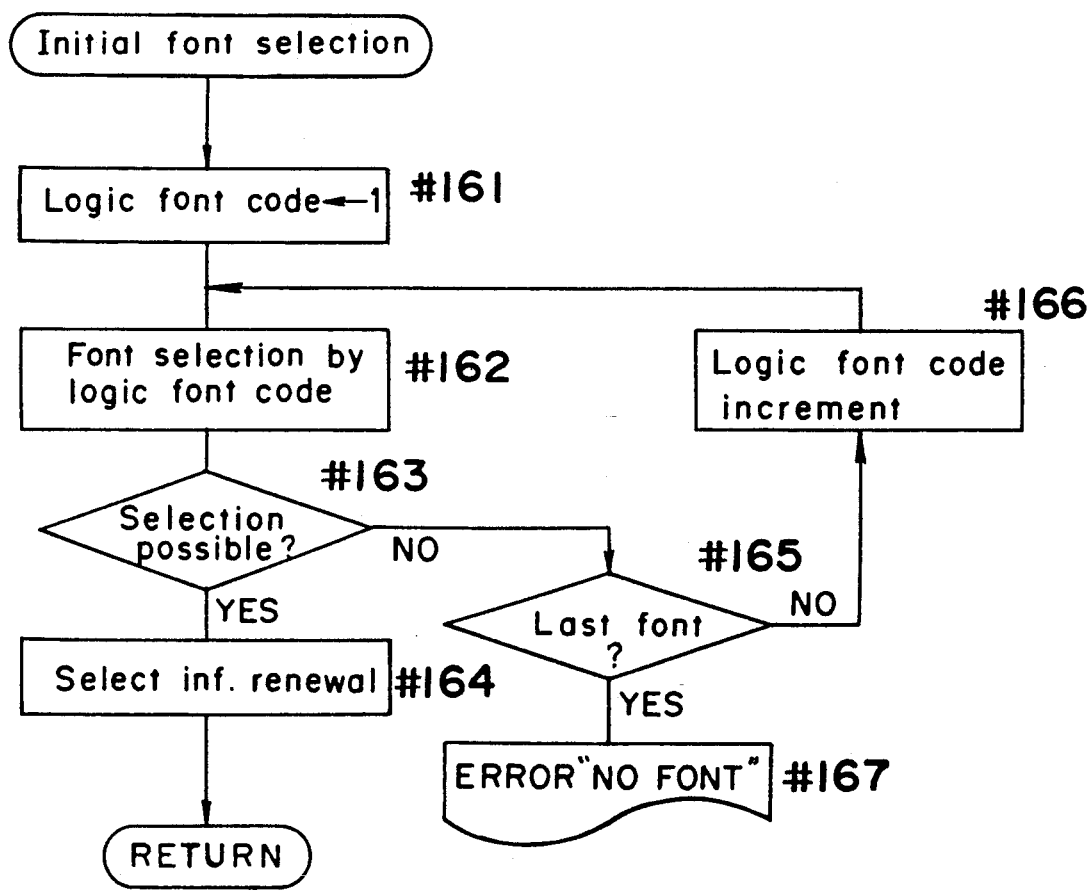
FIG. 19 is a flow chart of a subroutine for initial font selection.

FIG. 19 shows a flow chart of the subroutine for selecting the initial font in the initial setting processing shown by step #4 in FIG. 14(a).

As the initial font (default font), a font having the minimum BANK number in the slot of minimum number is determined among available fonts.

At first, the logic font code is set at one at step #161. Then, the font selection processing is performed with respect to all fonts registered in respective FCBs at step #162 (See FIG. 20). If it is performed normally at step #163, the DEFAULT mode is memorized as selection information about the present font at step #164.

If no font selectable as the default font is registered in respective FCBs (at step #163), it becomes impossible to perform printing operation since BM-CPU 301 cannot read font data by failing to set the default font. Therefore, if the font is not the last font at step #165, the logic font code is incremented at step #166 to perform the font selection again at step #162. If it is not possible to select the default font until the last font, an error caution is displayed at step #167.

Figure 20:
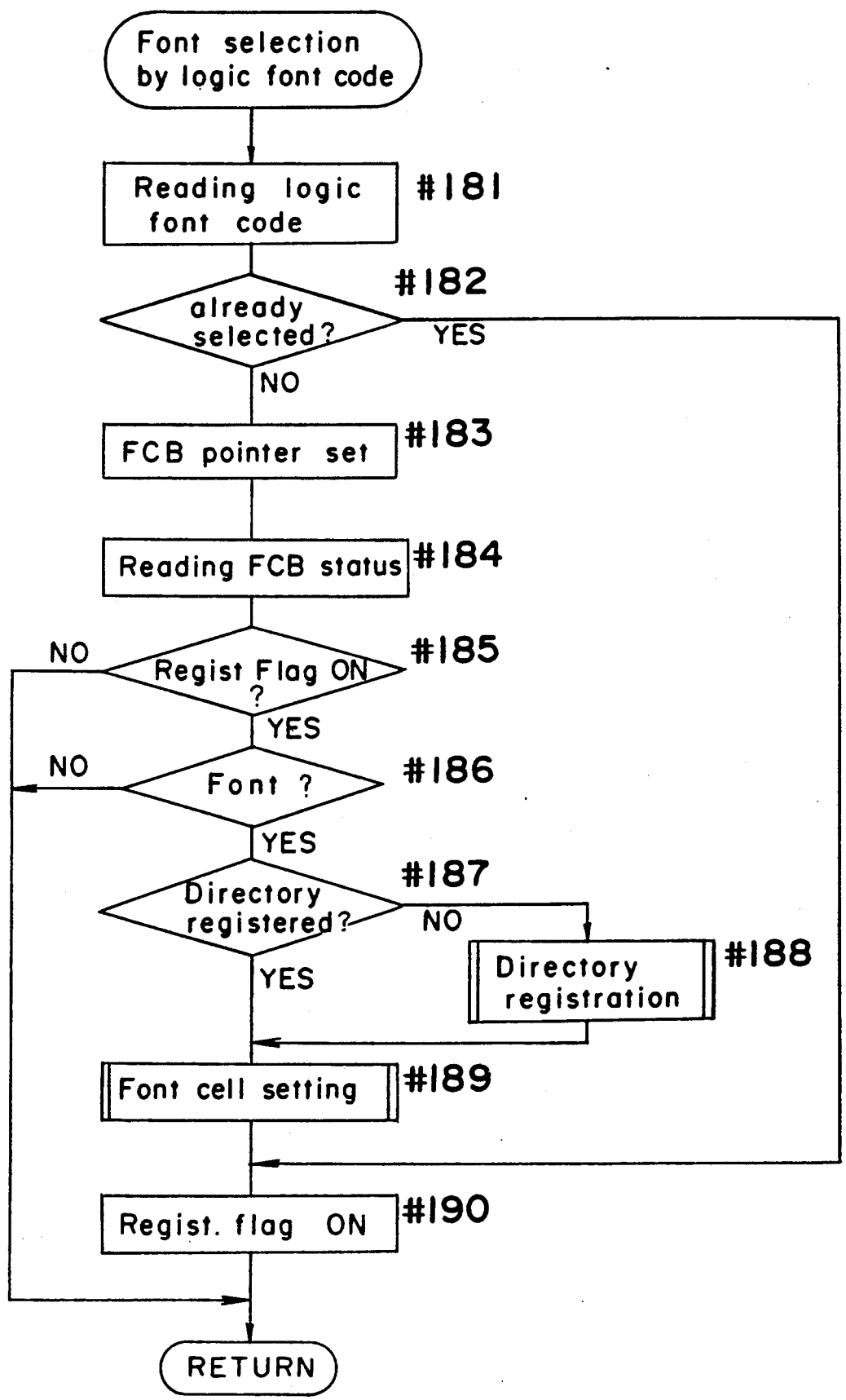
FIG. 20 is a flow chart of a subroutine for font selection by logic font code.

FIG. 20 shows a flow chart of the font selection processing by the logic font code.

At first, the selected logic font code is read at step #181. If the font is not selected yet at step #182, FCB pointer is shifted from the logic font code at step #183 in order to read FCB status at step #184.

If the REGISTERED flag has been set at step #185 and if the FCB status indicates a font at step #186, it is checked whether the directory thereof has been registered or not at step #187. If it is not registered yet, the directory registration operation is performed at step #188 (See FIG. 19).

Figure 21:
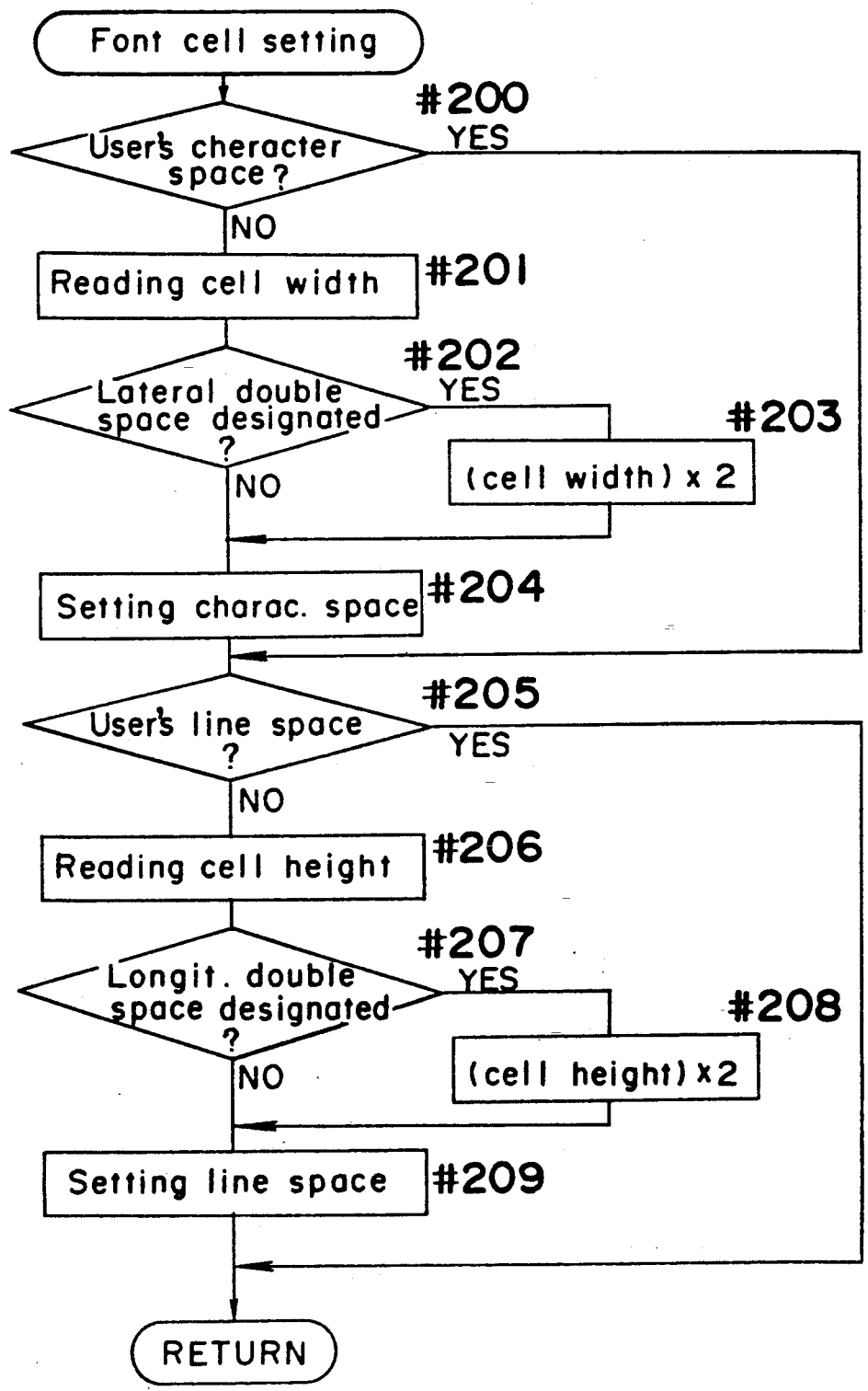
FIG. 21 is a flow chart of a subroutine for setting a font cell.
Figure 24A:
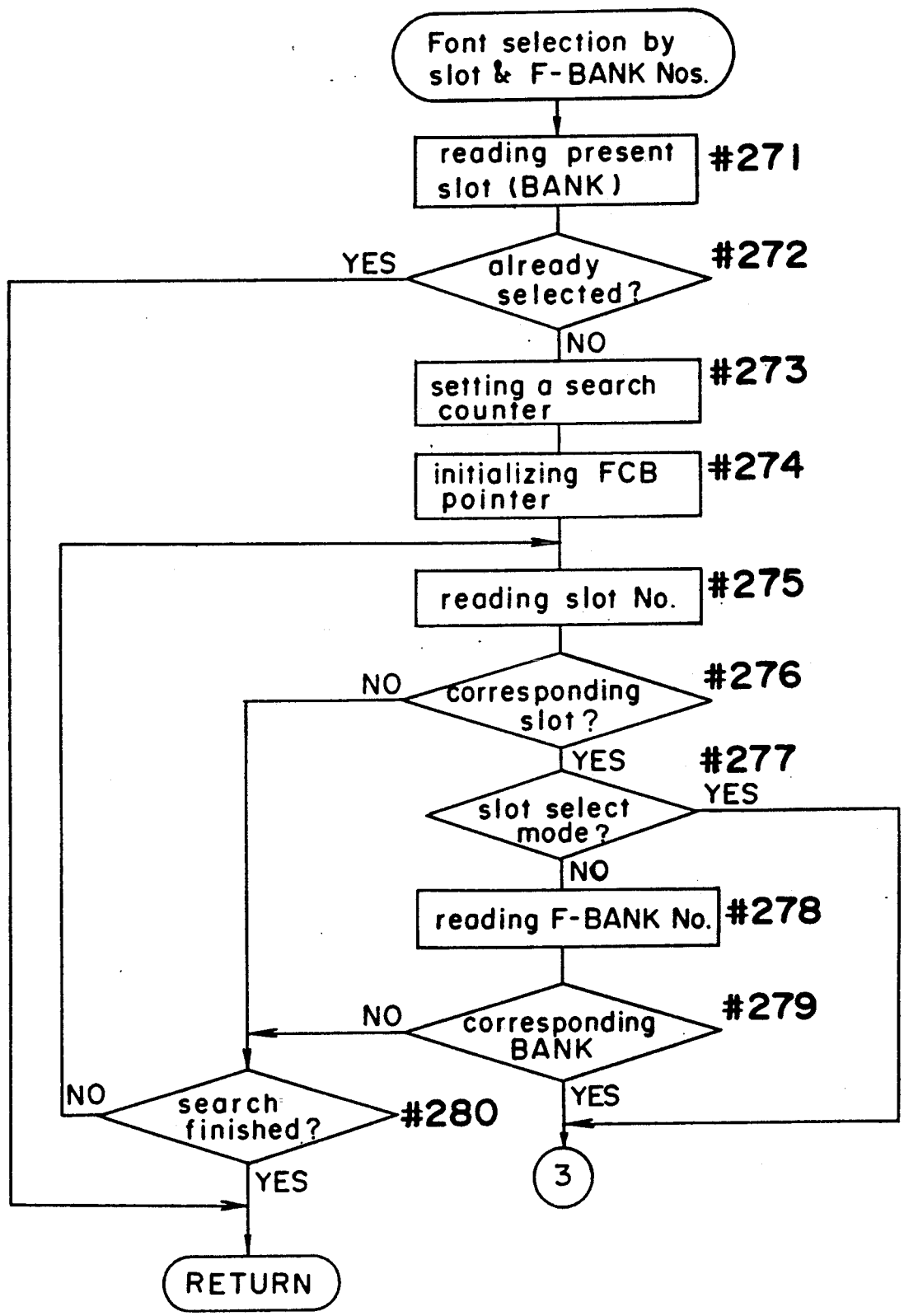
FIG. 24 is a flow chart of a subroutine for reading down font pattern data.
Figure 24B:
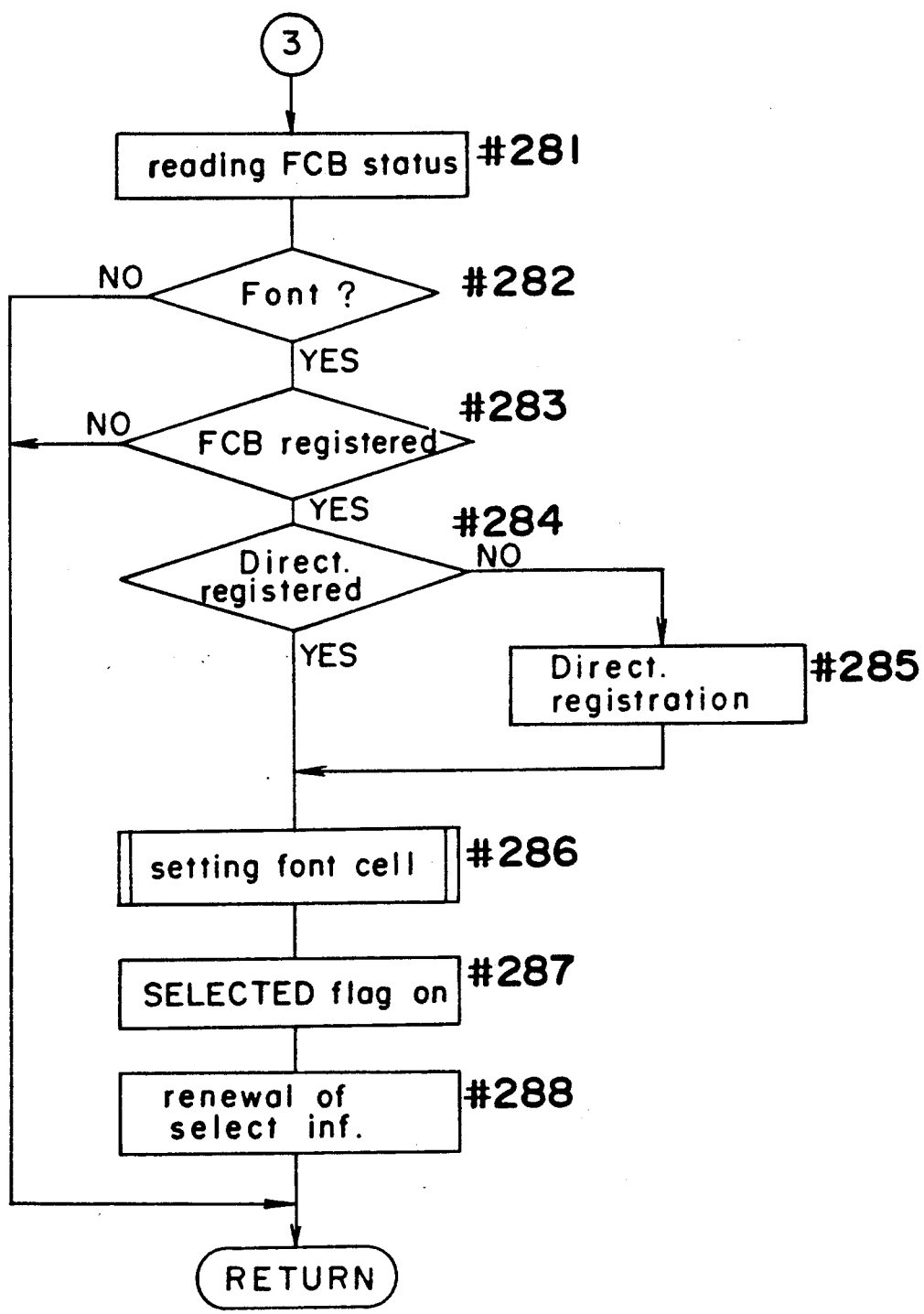
Figure 25:
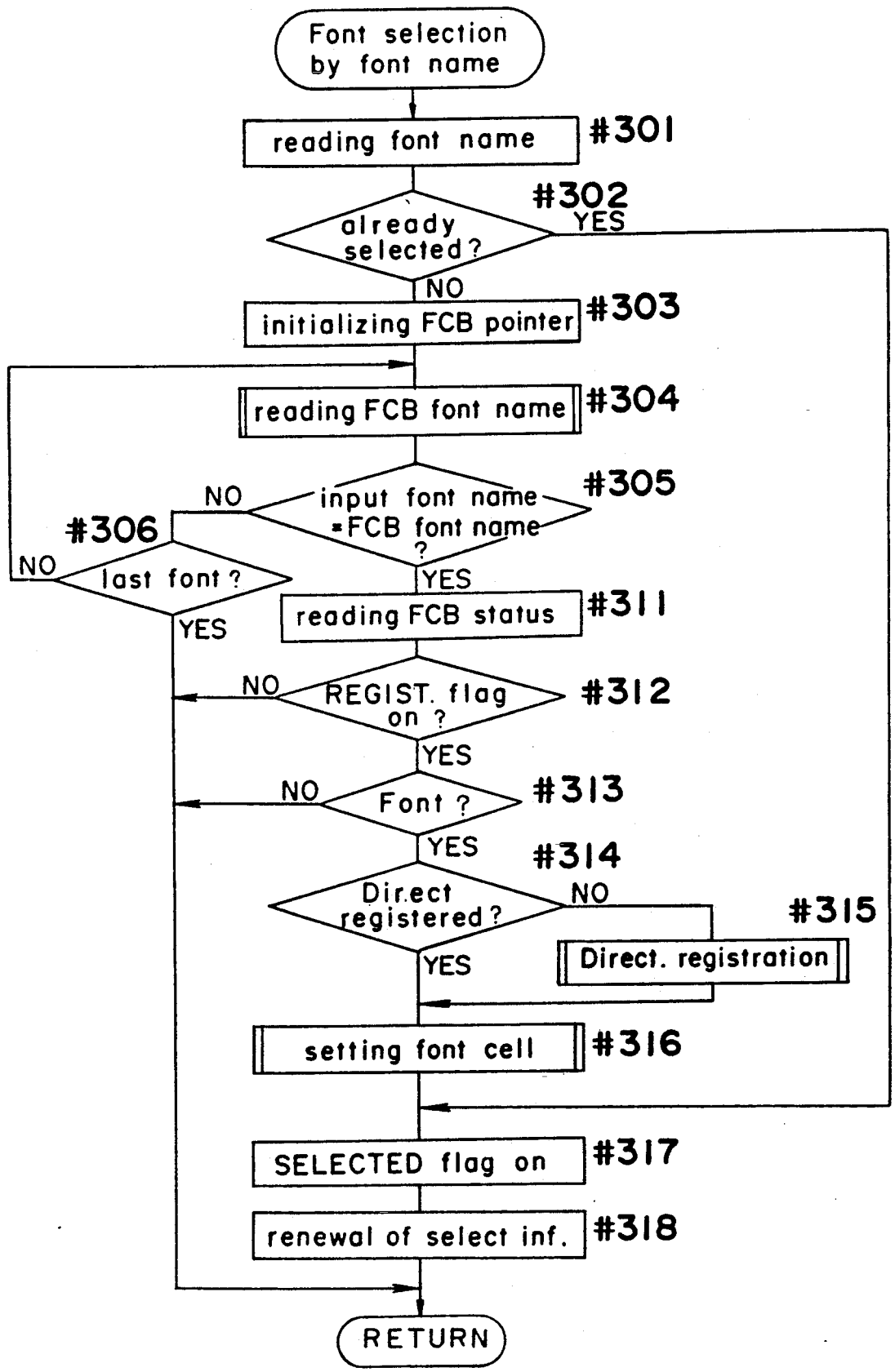
FIGS. 25(a) and 25(b) are flow charts of a subroutine for font selection by slot and F-BANK Nos.

Next, a font cell is set at step #189 (See FIG. 21). If the font has been selected already at step #182, SELECTED flag indicating the FCB into which the font has been registered is set on directly at step #190.

If REGISTERED flag is not set on at step #185, or if the FCB status does not indicate a font at step #186, process returns without doing any processing.

FIG. 21 shows a flow chart of the subroutine of step #189 in FIG. 20 for setting a font cell.

This processing is provided for registering the character space and line space which are used to move a cursor in unit of character.

Since these spaces can be designated by an user, it is checked at steps #200 and #205 if they have been designated or not. If they have been designated, the following processing is not performed. If they have not been designated, the maximum character width is read into from FCB global data at step #201. If the lateral double space is designated by protocols from the external data processor 1 at step #202, the cell width is doubled at step #203 and the doubled cell width is registered as the character space at step #209.

FIG. 22 shows a flow chart of a subroutine for renewing virtual fonts to be stored in individual VFCBs.

This processing is performed in order to give the most suitable font upon switching on the power switch or upon interchanging a font cartridge.

At first, VFCB pointer is set at the top of VFCB area at step #221. If the font has been registered in the corresponding VFCB at step #222, logic font codes are registered in the corresponding VFCB at step #223. This processing is repeated with respect to all of VFCBs at step #224.

FIG. 23 shows a flow chart of the subroutine #223 of FIG. 22 for registering logic font codes.

In this processing, a font having attributes closest to those of the VFCB can be searched.

At first, a status at the top of the present VFCB is read at step #241. If it indicates the registration thereof, the process is advanced to step #243. At step #243, LFNO for indicating the number of the closest font and MAX_MATCH indicating the matching depth thereof are reset at zero, respectively. Then, logic font attributes of the first FCB are read at first at step #244 and the parameter MATCH indicating the matching depth between virtual font attributes of VFCB and logic font attributes of FCB is initialized at step #245.

Comparison of the former with the latter is made sequentially from the use code to the character weight. One of virtual font attributes of the present VFCB is read at step #246 and it is compared with the corresponding logic font attribute at step #247. If it coincides with the latter, the parameter MATCH is incremented by one at step #248. This parameter MATCH is usually incremented if both of them coincide with each other, but as far as the character pitch and character height are concerned, it is incremented when the logic font attribute closest to the virtual font attribute is found even if they do not coincide with each other perfectly.

When the comparison with respect to all of seven font attributes have been completed at step #249, MATCH is compared with MAX_MATCH of the latest font, and if the former is larger than the latter at step #250, the latest MAX_MATCH and LFNO are renewed by MATCH and the present FCB No. at step #251.

Logic font attributes of the next FCB are compared similarly.

When the attribute comparison has been completed with respect to all of registered FCBs, the logic font code (LFNO) of the font having the largest MATCH is registered as the logic font code of VFCB at step #253.

FIG. 24 shows a flow chart of the font down-load processing.

Data composition in the font down-load processing is comprised of down-load slot data, font data and check sum data. The check sum data is data obtained as the result of addition of all transmitted data and is compared with the result of addition of all data received by the character generator. If they do not coincide with each other, "TRANSMISSION ERROR" is displayed.

At first, the slot number designated by the external data processor 1 is read at step #291 and the status of the FCB corresponding thereto is read at step #292.

If the font cartridge designated by the slot number is not a RAM font cartridge at step #293 (RAMFONT flag OFF), or if it is a RAM font cartridge into which font data has been down loaded already (LOADED flag ON at step #294), an error processing is executed at #295, namely, "COMMAND ERROR" is displayed.

If it is an unloaded RAM font cartridge, font data transmitted from the external data processor 1 is read and written into the font RAM thereof sequentially at step #296. At step #297, check sum data is calculated by counting the read font data upon writing them into the font RAM.

When the down-load of font data has been completed, the check sum given by the external data processor and that calculated at step #297 are compared at step #298. If they do not coincide with each other, "COMMUNICATION ERROR" is displayed at step #300.

If they coincide with each other, LOADED flag of the status of the FCB is set on at step #299.

(e) FONT Reselection

When font selection is indicated by the external data processor 1, it is executed according to either one of four methods as stated in the section (b).

(1) Font selection by slot and BANK Nos.

FIGS. 25(a) and 25(b) show a flow chart of the font selection by slot and BANK Nos.

In the present invention, font selection by slot No. and that by BANK No. are provided separately with each other. According to the former font selection, the font of the top BANK (first BANK) of the slot designated by a slot number is selected when the slot number is designated.

On the contrary, according to the latter font selection, when an F-BANK No. is designated, the font of the F-BANK designated thereby is selected within the slot having been selected at present.

The font selection is performed based on the analysis of received data at step #24 of FIG. 14(a).

At first, the number of the slot (F-BANK) having been selected at the present is read at step #271. If it coincides with that designated by a command from the external data processor 1 (at step #272), the following processing is not performed since the font has been selected already.

If it does not coincide with, the maximum number of kinds of registerable fonts is set to a loop counter provided as a search counter at step #273 and FCB pointer indicating the top address of FCB is set at zero at step #274.

If the font selection is requested by the slot number (YES at step #277), the slot number and the number of F-BANK in the slot are read subsequently at steps #275 and #278. Then, they are compared with the designated slot No. and F-BANK No. in the slot at step #276 and #279, respectively.

This comparison is repeated until the corresponding font is found out. As stated above, all of slots are searched in the font selection by the slot No. and, in the font selection by the F-BANK No., all of fonts contained in one slot (font cartridge) are searched.

If there is not any corresponding slot or F-BANK, or if the corresponding slot or F-BANK in slot is not registered as FCB, the process returns without doing any more processing.

Next, FCB status of the corresponding font having been searched is read at step #281. If font flag FONT has been set at #282, the font is recognized and, if the global information has been registered in FCB at step #283, it is recognized as a valid font.

Next, if the directory thereof is considered not to have been registered by referring to directory registration flag FDIR at step #284, the directory registration processing (See FIG. 18) is executed at step #285. As stated above, in the directory, information related to each character such as character size, an address of the corresponding dot pattern and the like is included.

Next, the font cell setting processing (See FIG. 21) is executed at step #286 to renew the character space and line space for print format control according to the selected font and, then, SELECTED flag is set at step #287. Finally, the selection information is renewed at step #288. Namely, the last select mode and either or both of the slot No. and the F-BANK No. are renewed according to the requested method.

If any font is not recognized at step #282 and if font data is not registered at step #283, the process skips steps from #284 to #288.

(2) Font Selection by Font Name

Figure 26:
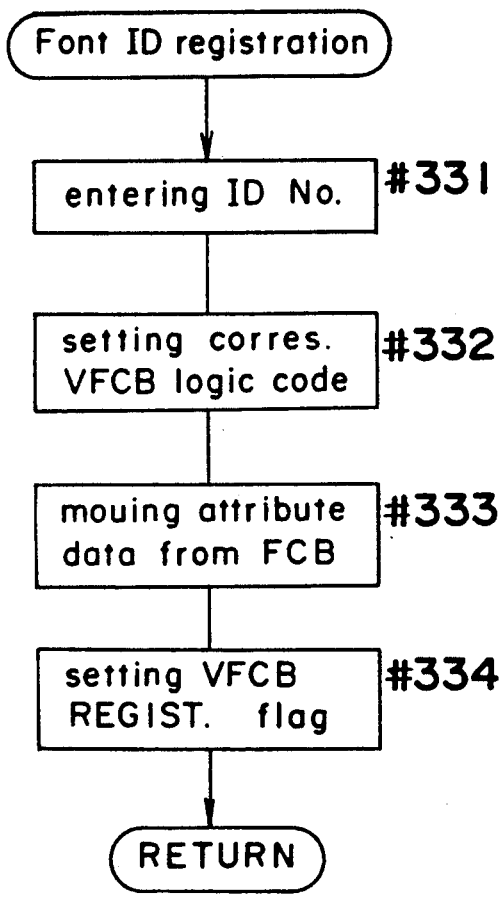
FIG. 26 is a flow chart of a subroutine for font selection by font name.

FIG. 26 shows a flow chart of the font selection by the font name.

Procedure in this routine is substantially same to that in the font selection by slot and F-BANK Nos., but the former is different from the latter in that selection information is comprised of a font name defined with use of six characters.

At first, the font name having been selected at the present is read at step #301. If it coincides with the font name designated by a command from the external data processor 1 at step #302, the process skips the following search steps since this means that the font has been selected already.

If the font having the designated font name has not been registered yet, FCB pointer indicating the top address of FCB is set at zero at step #303. Then, each font name of FCB is read at step #304 and it is compared with the designated font name at step #305. This search is continued until the font name coinciding with the designated font name is found out.

If the corresponding font is not found out till the last font, the process returns without executing any further step (step #306).

Next, the FCB status of the searched font is read at step #311. If the font flag FONT has been set, the font is considered to have been registered in an FCB at step #312. Further, if it is recognized as a font at step #313, it is considered to be a valid font. Next, if it is decided at step #315 by referring to FDIR that the directory of the font have not been registered, the directory is registered at step #315 (See FIG. 15).

Next, the font cell setting processing (See FIG. 21) is executed in order to renew the character space and line space for the print format control according to the selected font at step #316 and, then, SELECTED flag is set at step #317. Finally, the selection information is renewed at step #318.

If the searched font is not registered in an FCB (at step #312) or if it is not recognized as a font at step #313, the process skips steps from #314 to #318.

(3) Font Selection by ID Number

When an user designate an ID No. through the external data processor 1, it is registered in the analysis & processing process for received data. And, the font can be altered by the designated ID No.

Figure 27:
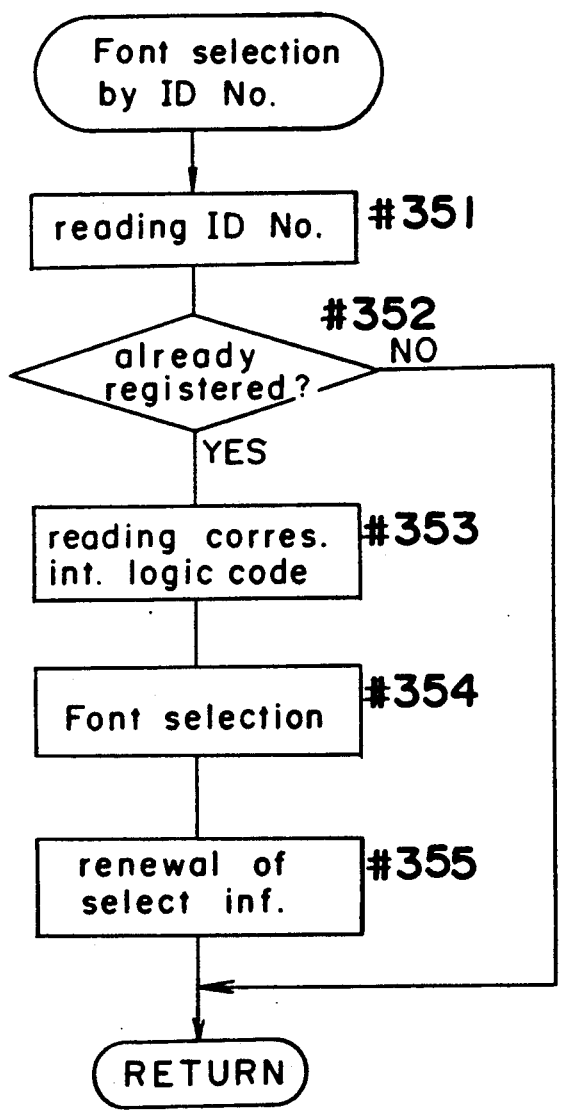
FIG. 27 is a flow chart of a subroutine for font ID registration.

FIG. 27 shows a flow chart of the font ID registration processing.

At first, the designated ID No. (VFCB code) is read at step #331, the logic font code having been selected at the present is registered in the designated VFCB at step #332 and, also, the logic font attributes of the corresponding FCB are registered into VFCB at step #333. Thereafter, VFCB REGISTERED flag is set at #334.

Figure 28:
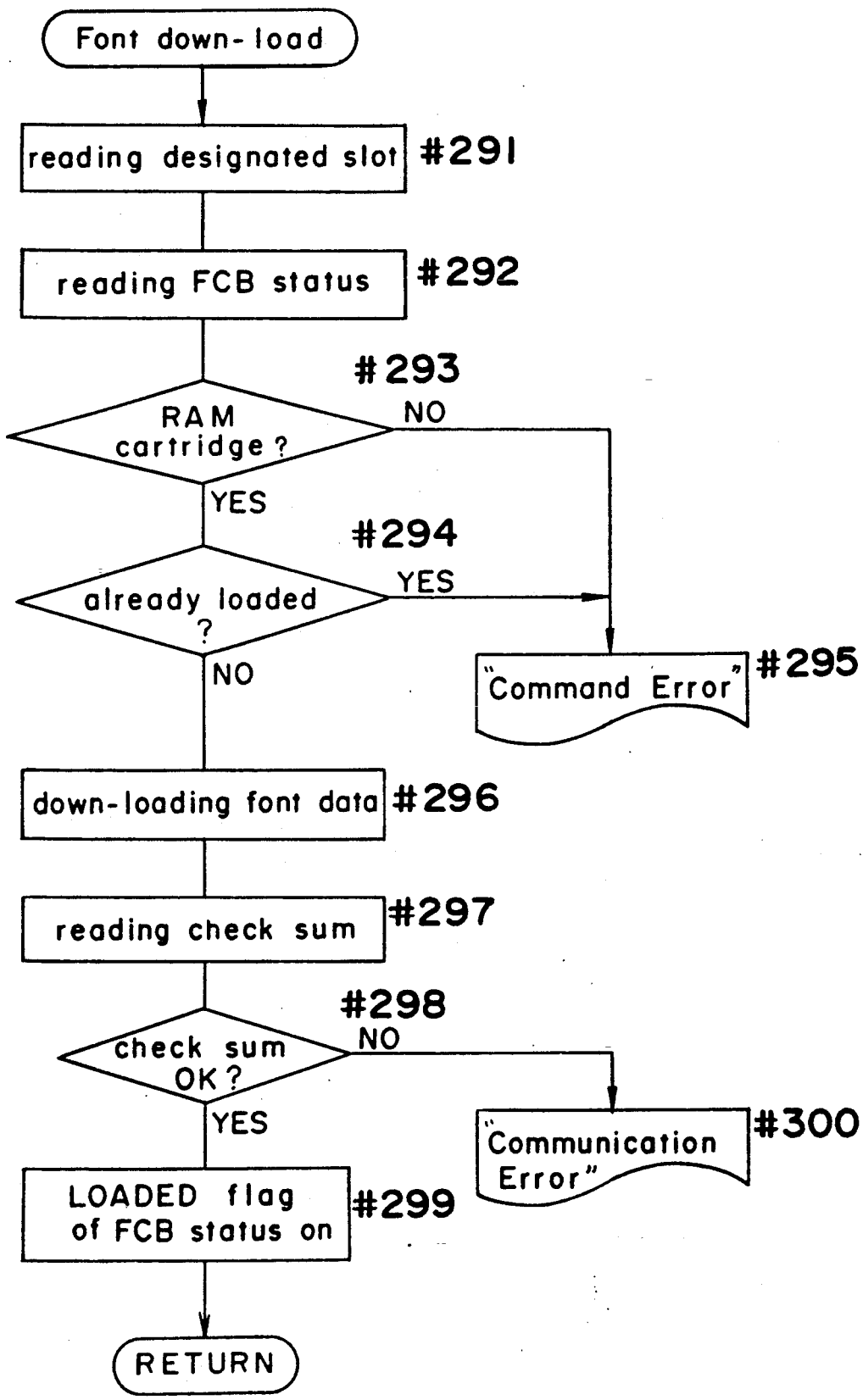
FIG. 28 is a flow chart of a subroutine for font selection by ID No.

FIG. 28 shows a flow chart for the font selection by ID No.

When the font selection by ID No. is requested by a command from the external data processor, the designated ID No. is read at step #351 and it is checked at step #352 whether or not any font registered in the corresponding VFCB exists at step #352 and, if it exists, the corresponding logic font code is read at step #353. Then, the font selection processing shown in FIG. 20 is executed at step #354 and the selection information including ID mode, ID No., and the like is renewed at step #355.

Although the designated ID No. is registered corresponding to the font having been selected upon registering it in the present embodiment, it is also possible to register a combination of the designated font name and at least one specified attribute.

(4) Font Selection by Images about Each Font

Figure 29:
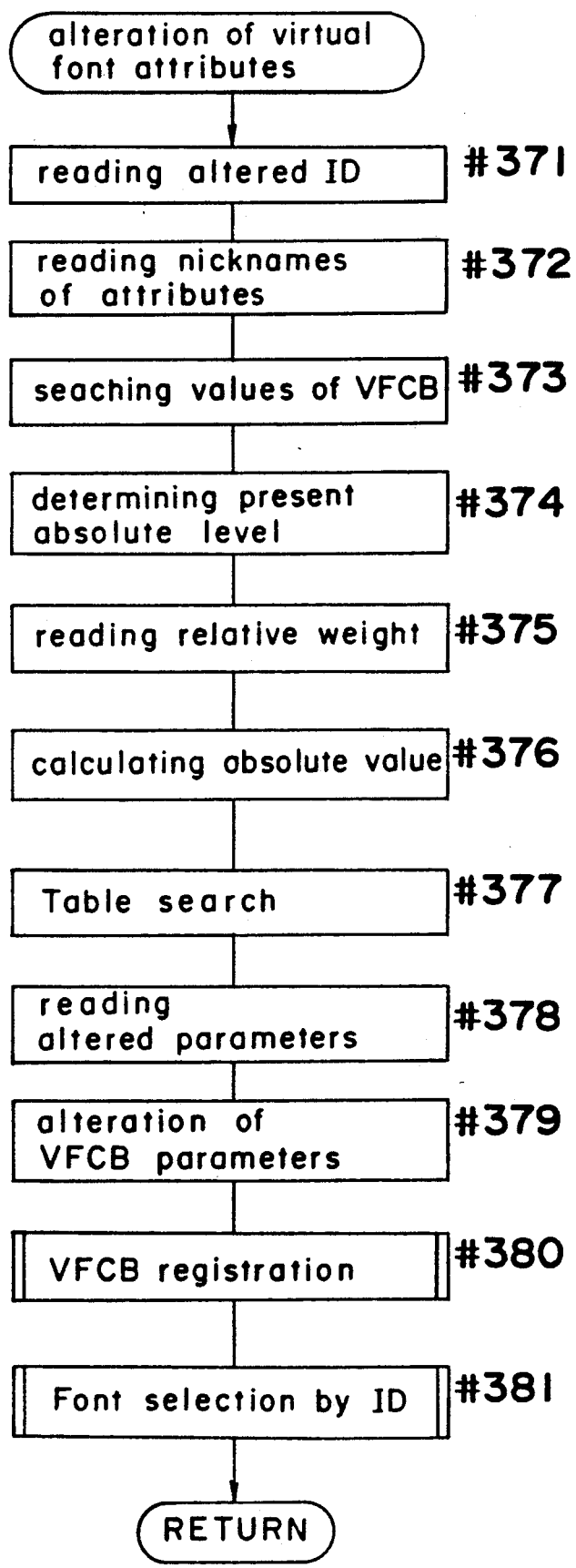
FIG. 29 is a flow chart of a subroutine for altering virtual font attributes.

FIG. 29 shows a flow chart for the font selection by images.

In this processing parameters of three kinds, namely, a desired ID No., nicknames regarding attributes of a desired font and relative weight values of those attributes are input by an user.

At first, the designated ID No. and nicknames of attributes are read at steps #371 and #372 and values of VFCB corresponding to them are searched at step #373. Then, the absolute level at the present is calculated from the values of VFCB using Table 2 at step #374.

Next, an absolute value is calculated by adding designated relative weight with the absolute level at step #375 and again, Table 2 is searched at step #377. Then, parameters to be altered are read at step #378 and parameters of VFCB are renewed to the former parameters at step #379. Thereafter, VFCB registration is executed at step #380 (See FIG. 23).

Then the font selection is executed in accordance with the registered VFCB at step #381.

The preferred embodiments described herein are illustrative and not restrictive, the scope of the invention being indicated by the appended claims and all variations which come within the meanings of the claims are intended to be embraced herein.

What is claimed is:

1. A font managing apparatus for a character generator which generates character images based on font data stored in a font memory, said font data including pattern data and a group of attributes of at least one kind of font, comprising:

an entry means for entering information necessary for designating a font to be used for generating characters;

first memory means for memorizing plural groups of attributes;

second memory means for memorizing addresses of respective groups of attributes in said first memory means;

group managing means for checking whether a group of attributes corresponding to a designated font is memorized in said first memory means or not, said group managing means loading the corresponding group of attributes into said first memory means if it is not memorized therein and writing an address of said corresponding group of attributes in said first memory means; and means for deleting data of a group of attributes which is loaded in said first memory means earliest.

2. A font managing apparatus as claimed in claim 1, in which said first memory means is comprised of a ring buffer.

3. A font managing apparatus for a character generator for managing plural available fonts, comprising:

an entry means for entering font information including information regarding a value of a relative level for reflecting the strength of a predetermined characteristic of a font to be designated;

first memory means for storing data which signifies attributes of said available fonts;

calculation means for calculating an absolute level for reflecting the strength of said characteristic based on a value of the level of a font which has been selected and said value of the relative level;

second memory means for memorizing a table which relates the attributes with the absolute level; and a font selection means for selecting a font among said available fonts which has attributes corresponding to the absolute level referring to said table of the second memory means and the data stored in said first memory means.

* * * * *